United States Patent [19]

Gernand et al.

[11] 4,255,166
[45] Mar. 10, 1981

[54] PROCESS FOR THE REMOVAL OF PARTICULATES ENTRAINED IN A FLUID USING A MAGNETICALLY STABILIZED FLUID CROSS-FLOW CONTACTOR

[75] Inventors: Martin O. Gernand; Francis X. Mayer, both of Baton Rouge, La.; Vincent Siminski, Rockaway, N.J.

[73] Assignee: Exxon Research and Engineering Company, Florham Park, N.J.

[21] Appl. No.: 62,540

[22] Filed: Jul. 31, 1979

[51] Int. Cl.³ .............................................. B03C 1/00
[52] U.S. Cl. .............................................. 55/3; 55/79; 55/99; 55/100; 55/479; 55/484; 34/1; 34/10; 34/57 B; 422/216; 252/474; 423/244; 204/155
[58] Field of Search ............... 55/79, 3, 99, 100, 479, 55/474, 484; 34/1, 174, 10, 57 B; 422/216; 210/222, 223; 252/474; 423/244 R; 204/155

[56] References Cited

U.S. PATENT DOCUMENTS

| 2,048,113 | 7/1936 | Gahl . | |
|---|---|---|---|
| 3,067,131 | 12/1962 | Bergstrom | 55/3 |
| 3,296,775 | 1/1967 | Squires . | |
| 3,380,589 | 4/1968 | Gray . | |
| 3,437,561 | 4/1969 | Squires . | |
| 3,439,899 | 4/1969 | Hershler . | |
| 3,440,731 | 4/1969 | Tathill . | |
| 3,460,912 | 8/1969 | Squires . | |
| 3,481,471 | 12/1969 | Spodig . | |
| 3,481,834 | 12/1969 | Squires . | |
| 3,597,327 | 8/1971 | Squires . | |
| 3,716,969 | 2/1973 | Maeda | 55/479 |
| 3,816,401 | 6/1974 | Hansford | 252/474 |
| 3,840,353 | 10/1974 | Squires . | |
| 3,926,587 | 12/1975 | Squires . | |
| 3,926,593 | 12/1975 | Squires . | |
| 3,961,020 | 6/1976 | Seki . | |
| 4,006,533 | 2/1977 | Squires . | |
| 4,023,939 | 5/1977 | Juntgen . | |
| 4,035,170 | 7/1977 | Lear, Jr. et al. | 55/479 |
| 4,038,052 | 7/1977 | Melcher . | |
| 4,083,701 | 4/1978 | Noack | 55/99 |
| 4,115,927 | 9/1978 | Rosensweig . | |
| 4,133,660 | 1/1979 | Steiner | 55/479 |
| 4,136,016 | 1/1979 | Rosensweig | 423/DIG. 16 |
| 4,146,371 | 3/1979 | Melcher . | |

FOREIGN PATENT DOCUMENTS

| 2122363 | 2/1972 | Fed. Rep. of Germany | 55/479 |
|---|---|---|---|
| 2239827 | 2/1974 | Fed. Rep. of Germany | 55/479 |
| 2552298 | 8/1976 | Fed. Rep. of Germany | 55/79 |
| 2842718 | 4/1979 | Fed. Rep. of Germany | 55/131 |
| 375086 | 6/1973 | U.S.S.R. . | |
| 488601 | 2/1976 | U.S.S.R. . | |
| 526369 | 10/1976 | U.S.S.R. | 55/100 |
| 551037 | 6/1977 | U.S.S.R. . | |
| 639579 | 12/1978 | U.S.S.R. . | |

*Primary Examiner*—Bernard Nozick
*Attorney, Agent, or Firm*—Albert P. Halluin

[57] ABSTRACT

A process for the removal of particulates entrained in a fluid using a magnetically stabilized fluid cross-flow contactor of the panel or radial reactor type wherein ferro-magnetic bed solids are structured or stabilized by the action of a magnetic field.

11 Claims, 12 Drawing Figures

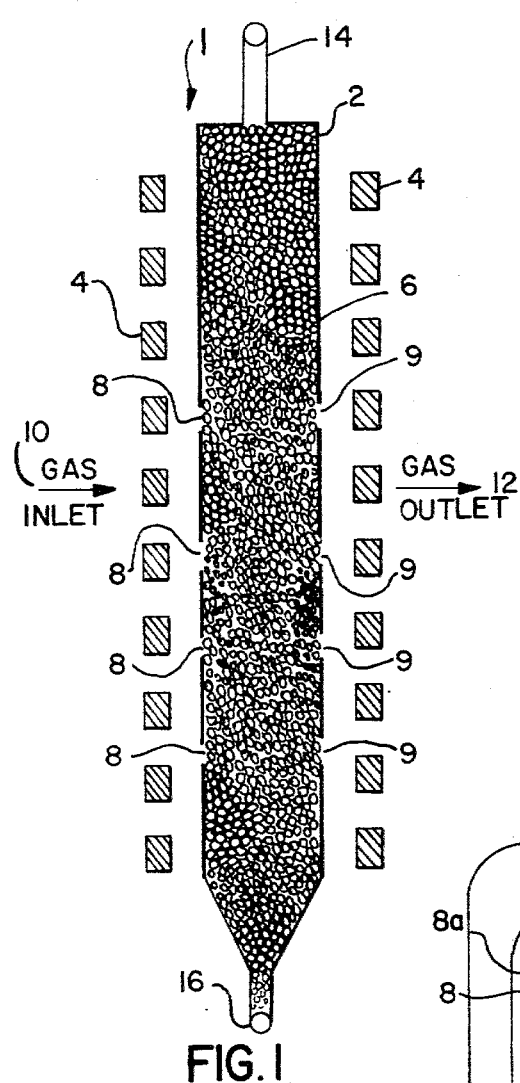
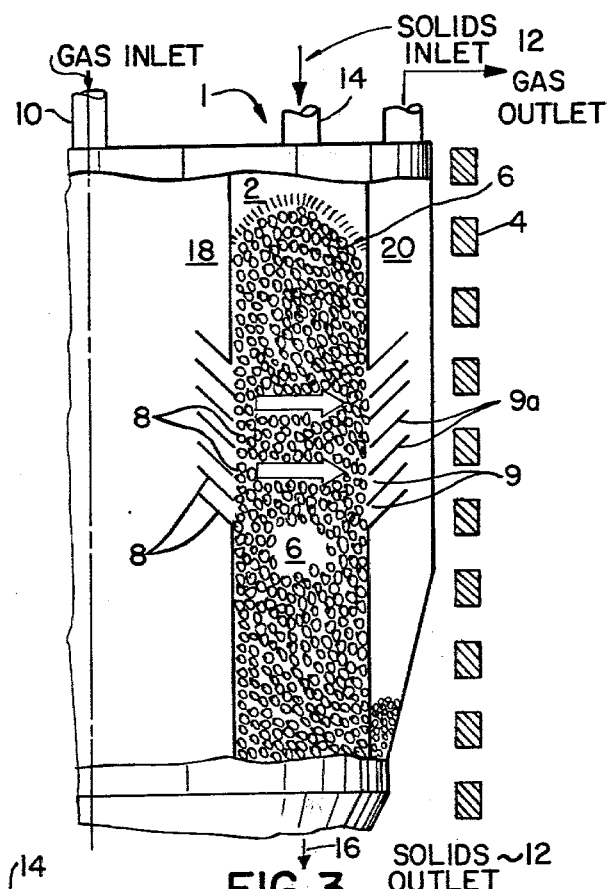
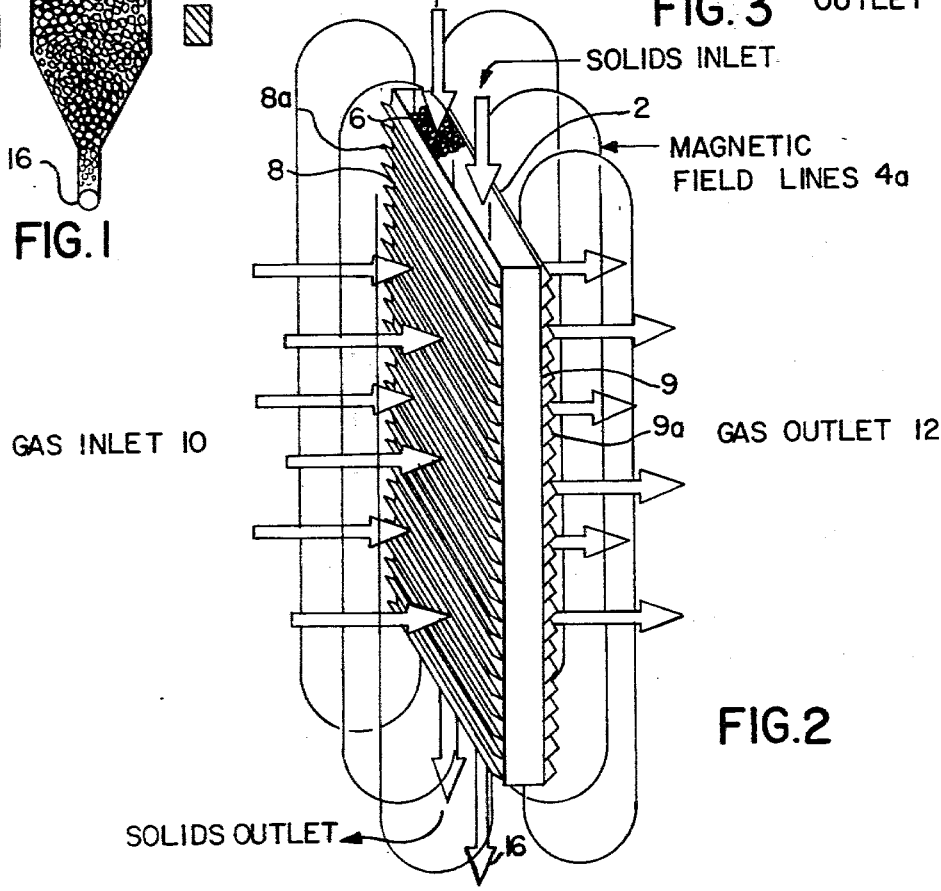
FIG. 1
FIG. 3
FIG. 2

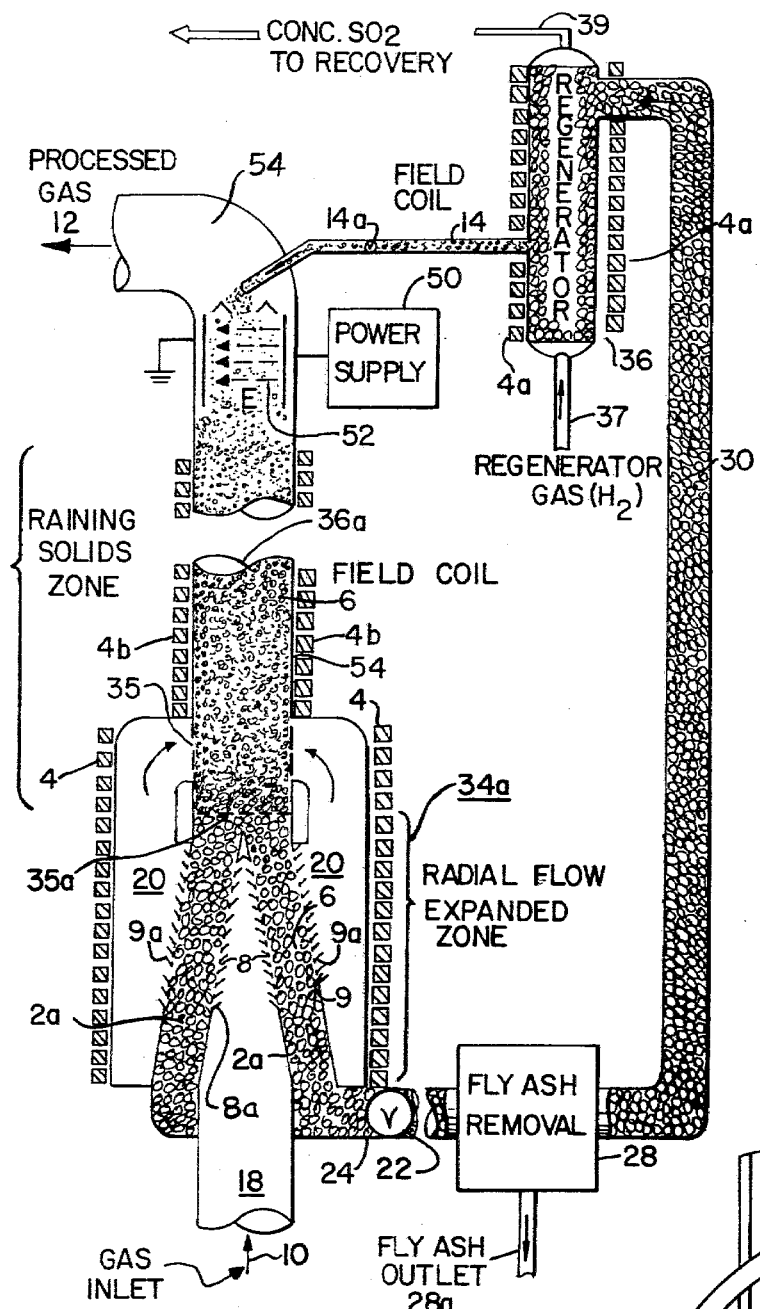
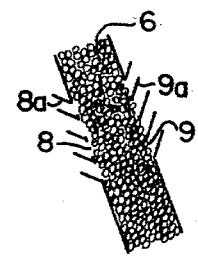
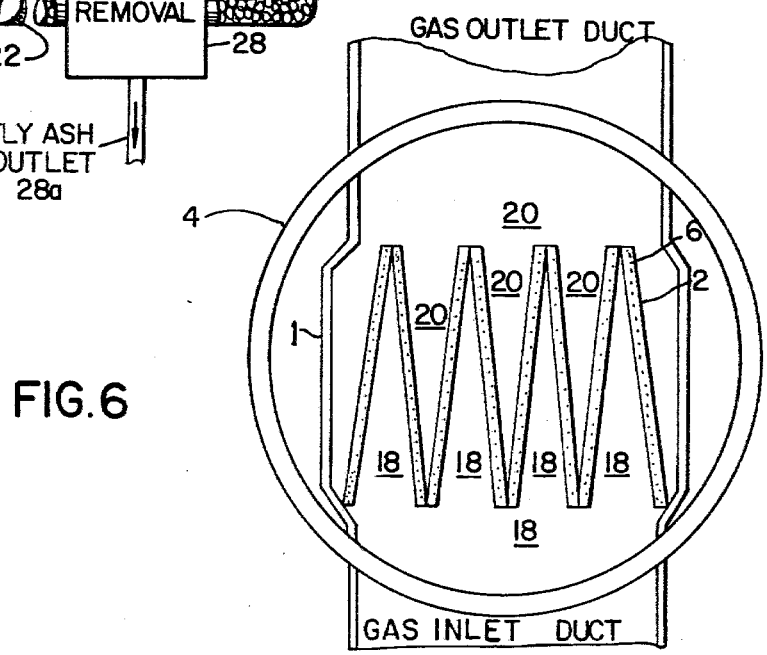
FIG. 5
FIG. 5a
FIG. 6

PROCESS FOR THE REMOVAL OF PARTICULATES ENTRAINED IN A FLUID USING A MAGNETICALLY STABILIZED FLUID CROSS-FLOW CONTACTOR

BACKGROUND OF THE INVENTION

1. Field of the Invention

The present invention relates to a fluid cross-flow fluid-solid contactor of the panel or radial reactor type wherein ferromagnetic bed solids are structured or stabilized by the action of a magnetic field, and is particularly concerned with means for contacting fluids and solid particles in one or more such cross-flow beds having an imposed magnetic field. The invention also relates to a method for removing particulates from a gas containing the same and flue gas desulfurization processes utilizing a cross-flow or panel bed contactor stabilized by the action of a magnetic field.

2. Description of the Prior Art

There is considerable interest in the field of fluid-solids contacting, particularly gaseous fluids. Such processes have found uses in coal gasification, catalytic reactions, gas absorption, gas adsorption, and filtering particulate material from gases and flue gas desulfurization processes. Many such processes are carried out in fluidized beds, i.e., beds containing a mass of solid fluidizable particles in which the individual particles are effectively buoyed by fluid drag forces whereby the mass or fluidized bed possesses the characteristics of a liquid. These fluidized beds are conventionally produced by effecting a flow of a fluid such as a gas through a porous or perforated plate or membrane underlying the particle mass, at a sufficient rate to support the particles against the force of gravity. Conditions at the minimum fluid flow required to produce the fluid-like, or fluidized conditions, i.e., the incipient fluidization point are dependent on many parameters including particle size, particle density, etc. The increase in the fluid flow beyond the incipient fluidization point causes an expansion of the fluidized bed to accommodate the increased fluid flow until the fluid velocity exceeds the free falling velocity of the particles which are then carried out of the apparatus, a condition known as entrainment.

Recently, U.S. Pat. No. 4,115,927, described a process for stabilizing such fluidized beds against bubble formation by use of an axially applied magnetic field. The magnetically stabilized fluidized beds (MSFB) disclosed in the '927 patent are useful in carrying out the above-mentioned processes and particularly for removing solid particulates entrained in gaseous fluids. One problem connected with using the MSFB of the type disclosed in the '927 patent for particulate capture processes or other processes involving particulate containing gas streams, however, relates to plugging of the grid or perforated plate underlying the particle mass, thus causing substantial pressure drops to develop during operations as well as causing lost operating time while the grids are periodically cleaned.

A number of patents describe processes for the separation of particulates entrained in gaseous fluids by magnetic means. Such processes, quite often require the particulates themselves to be magnetic. One such process is described in U.S. Pat. No. 4,116,829. In this patent the gas containing the magnetic particulates entrained in the gas is passed through a chamber containing ferromagnetic filaments which are magnetized by an external magnetic field. The magnetic particulates adhere to the filaments. The particulates then are subsequently removed from the filaments.

Recently, J. R. Melcher at the Massachusetts Institute of Technology disclosed electrofluidized beds (EFB) for the collection of particulates entrained in a gaseous fluid. In such an EFB process, electrostatic fields are used to impress differential electric charges on the particulates to be captured so as to effect an attraction between such particulates and bed particles. Such processes are disclosed in U.S. Pat. Nos. 4,038,049 and 4,038,052 and the publications: Zahedi and Melcher, *J. Air Pollut. Contr.*, (1974). While Melcher et al. refer to cross-flow and colinear EFB's by the term cross-flow EFB's, they actually describe contactors wherein the gas flow levitates the fluidizable particles as in the typical axial flow contactor. Typically, a cross-flow gas contactor is understood to be a contactor wherein the gas flows perpendicular to the external force field, i.e., gravity. The EFB's described by Melcher et al. have been shown to be useful collecting particulates, especially submicron particulates. However, the EFB's having a vertical gas flow are unable to process gas streams at velocities greater than 1 ft./sec. without encountering substantial pressure drops and/or entrainment of solids, e.g., using sand particles.

Cross-flow and panel bed fluid-solid contactors (i.e., where the fluid (gas) flow is perpendicular to gravity) are well-recognized means for contacting solids and fluids (particularly gases), the first industrial use being known as the Deacon process developed nearly 100 years ago. Perry's Chemical Engineers' Handbook, 5th Edition discloses details of several fluid cross-flow contactors of the type described by Dorfan, Squires and Zenz. Such processes eliminate the need for a porous grid such as is required in fluidized beds of Rosensweig and Melcher et al. As reported by Squires and Pfeffer (*J. of the Air Pollution Control Association*, Vol. 20, No. 8, pp. 534-538 (1970) a considerable number of patents have been directed to cross-flow or panel bed devices. Squires et al. reported that many of these patents are directed to means for regulating the flow of the gravitating solid or means for withdrawing the solids. A number of patents have been granted on the use of panel beds as filters to remove particulates from gaseous streams. In these patents the panel beds are described as having each gas-entry surface free of loose surface particles of the filter solid. The surface is generally inclined at the solid particles' angle of repose, and it rests upon a louver. The solid particles used in these processes are generally rather large. U.S. Pat. No. 3,296,775 to Squires discloses that filter cake and a controlled amount of filter solid can be removed from each gas-entry surface by applying a surge backflow of gas from the clean side of the panel. Various improvements have been described in U.S. Pat. Nos. 3,410,055; 4,006,533; 4,004,986; 3,982,326; 4,004,350; 3,926,587; 3,926,593; 3,957,953, 3,981,355; 3,987,148; and 4,000,066.

U.S. Pat. Nos. 4,102,982 to Weir, Jr.; 4,017,278 and 4,126,435 to Reese also disclose processes for removing finely divided solids from gaseous streams by use of gas cross-flow contactors. The Reese patent discloses the use of louvered surfaces formed by perforating the walls to form louver vanes inclined to the vertical at angles ranging from 15° to 80°.

U.S. Pat. No. 3,966,879 to Groenendaal et al. discloses a process for the removal of particulate matter and sulfur oxides from waste gases which comprises cross-current contacting of the waste gas stream with a moving bed of supported, copper-containing acceptor.

The panel-bed or cross-flow contactors described by Squires, Dorfan, Zenz, Groenendaal and others are limited by the amount of gas throughput than can be tolerated before solids break-through using small particles. Therefore, the degree in which the particles can come into contact with a gas is limited.

In some industrial processes, particularly flue gas desulfurization processes, relatively high superficial gas volocities, i.e., the order of 2-8 ft./sec. (60-245 cm./sec.) and higher with particles having a mean diameter size about 300-1000 microns are desired. The high velocities are desired so as to keep equipment of a practical size, despite the large volumes of gas to be processed and the small particle sizes facilitate intimate contacting of all of the gas with bed solids and effective use of all of the bed solids. Contactors capable of such high velocities with relatively small particles and at low pressure drops have hitherto not been described. There is, none the less, a genuine need for a fluid-solids contactor which will permit fluid-solids contacting of small particles at high superficial gas velocities without solids breakthrough or solids-entrainment. There is also a need for such a contactor having a relatively low pressure drop and which does not encounter the problems associated with grid plugging.

DISCOVERY OF THE INVENTION

It has now been discovered that relatively small particles can be contacted with a fluid, preferably a gas, at high superficial gas velocities with minimal gas-solids entrainment and at relatively low pressure drops in a fluid cross-flow contactor wherein the solids are structured or stabilized by the action of a magnetic field, said particles being ferromagnetic or made ferromagnetic by the inclusion within the particle material having this property wherein the magnetic field is transverse to the flow of fluid through the bed of solid particles and substantially colinear with the external force field, i.e., gravity.

SUMMARY OF THE INVENTION

As one embodiment of the present invention, there is provided a magnetically stabilized fluid cross-flow bed (MSCFB), comprising:

(a) a chamber including an inlet port and an outlet port for introducing and removing a plurality of solid, discrete magnetizable particles;

(b) solenoid or magnet means for establishing magnetic field within said chamber;

(c) a plurality of opening means in said chamber which are arranged on substantially opposite sides of said chamber and being situated in such a manner as to cause the gas to flow with a velocity component substantially perpendicular to the external force field (e.g., gravity) within said chamber and substantially transverse with respect to the applied magnetic field.

The apparatus preferably includes a plenum means communicating with said opening means on said chamber for introducing and withdrawing fluid (e.g., gas) to and from said chamber.

The chamber preferably comprises one or more upwardly extending horizontally or alternatively concentric spaced-apart perforate retaining means wherein the retaining means are in communication with the respective gas inlet and gas outlet plenum.

As another embodiment of the invention, there is provided a process for contacting a gaseous medium with a bed of solid particles utilizing the magnetically stabilized fluid cross-flow bed of the invention.

Still another embodiment of the invention pertains to a process for removing particulates from gaseous streams, such streams exist in nitrogen oxide removal and flue gas desulfurization processes and in combined cycle power processes as hereinafter described.

The process of the invention utilizing the magnetically stabilized cross-flow bed contactor permits gas solids contacting at relatively high superficial gas velocities, e.g., gas velocities at the face of the contacting chamber ranging from 0.5 ft./sec. up to 10 ft./sec. and more, utilizing particles having a mean diameter of 1500 microns or less and preferably less than 1000 microns.

The primary advantages of the magnetically stabilized contactor are:

(a) No complicated and costly air distribution fluidizing grid is required to distribute the incoming gas within the contactor;

(b) By virtue of the compact nature of the contactor, i.e., the contactor may be typically two to twelve inches thick (and several feed high, e.g., up to about 50 feet or higher, very large geometrical face surface areas are possible within a relatively small volume pressure vessel. The action of the applied magnetic field on the magnetizable particles also provides for orientation of the particles in the bed and enables one to control the porosity (or void fraction) in the bed (the porosity of the bed or bed voidage in the magnetically stabilized cross-flow beds of the invention is typically 50 percent or more greater than the void fraction of conventional cross-flow and panel bed contactors). As a result of the bed structuring and the attendant high void fraction which accrues from these magnetic interactions, the pressure drop across the magnetic particle bed is extremely low.

(c) By virtue of the structuring of the bed a higher capacity for collecting or capturing particulates from gaseous streams, e.g., capture efficiencies of greater than 98% are possible when the bed contains up to 20-30 volume % of the captured particulates. The voidages in the magnetically stabilized cross-flow beds of the present invention are greater than a comparable fixed bed.

(d) The action of the applied magnetic field on the magnetizable particles permits the use of much higher superficial fluid velocities and permits the use of smaller particles than is practical with conventional, unstabilized cross-flow or panel bed contactors. The use of smaller particles permits better fluid-solid contacting, better particulate capture and greater chemical reaction rates than can be obtained with larger bed particles.

The higher voidages also permit superficial gas velocities up to 4 times or more than similar beds not stabilized by the magnetic field at comparable pressure drops. At the same pressure drops, the magnetically stabilized cross-flow beds of the present invention can possess 5 times or more bed particles per unit volume of bed compared to comparable fixed beds or moving beds because of the relatively smaller particle size which can be used. Thus, because of the smaller particle sizes which can be used in the contactor of the invention, the contactor can contain a larger external surface area of particles per unit volume of bed compared to a normal bed of the same pressure drop.

(e) The applied magnetic field on the bed of magnetizable particles imparts an anisotropic structure to the bed which, in particulate capture processes, increases filtering efficiency. This structuring also reduces the stripping of captured particles from the magnetized filter media.

(f) Since the contactor is in a generally upstanding vertical position, the solid magnetizable particles can be conveniently fed from the top of the contactor and the particles are simply withdrawn from the bottom by the flow of gravity. The flow of the particles can be controlled by a variable opening underneath the contactor or by controlling the applied magnetic field. The movement of the particles can be slowed down or literally locked in place increasing the magnetic field. Since the individual magnetic particles can be "locked" together by the interparticle magnetic forces generated by the external electromagnets, the particles form a continuous, but expanded element in the bed, which continuously falls at a controlled rate, to the bottom of the contactor in a plug-flow fashion. The continuous nature of this contactor requires only one contacting vessel, in contrast to fixed bed contactors (e.g., Squires) which require contacting swing reactor systems. The head pressure and gravity acting on the vertical columns containing the magnetized particles keeps the particles moving in a downward direction (when the magnetic field is not so high as to "lock" the particles in place) whereupon they exit through the port of the contactor. Preferably, the magnetic particles leaving the contactor are recycled back to the contactor for reuse. In the case of catalyst particles, sorbent particles or particles having captured particulates adhering or entrapped, it is preferred to pass such spent particles through a regenerator or separator before recycling them to the contactor. After the particles or catalyst particles have been cleaned or otherwise rejuvenated, they may be transported via pneumatic or other mechanical means to the top of the contactor where they begin their downward fall in a controlled manner into and through the contactor.

BRIEF DESCRIPTION OF THE DRAWINGS

FIG. 1 represents a vertical front cross-sectional view of the magnetically stabilized cross-flow contactor in a single stage mode.

FIG. 2 represents a left side perspective view of the magnetically stabilized cross-flow contactor of the panel bed type.

FIG. 3 represents a vertical front cross-sectional view of the magnetically stabilized cross-flow contactor of the annular type.

FIG. 5 is a vertical front cross-sectional view of the magnetically stabilized cross-flow contactor showing a dual contactor which includes the combination of cross-flow and raining solids contacting.

FIG. 5a represents a detailed vertical front cross-sectional view of a part of the cross-flow expanded zone of FIG. 5.

FIG. 6 is a cross-sectional top elevation view of a multi-panel contactor similar to FIGS. 1, 2, or 4.

DESCRIPTION OF THE PREFERRED EMBODIMENTS

Figure 4:
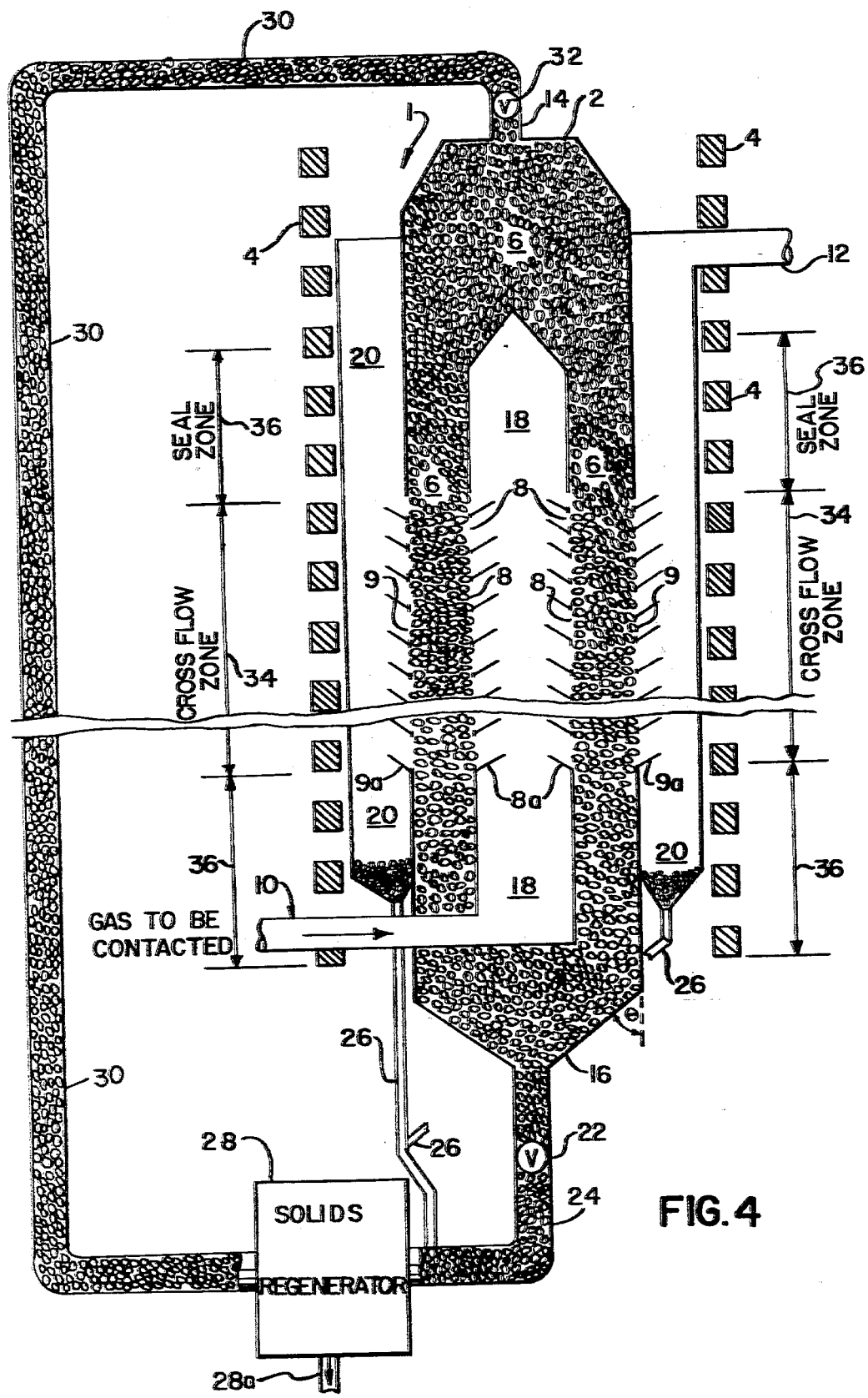
FIG. 4 is a vertical front cross-sectional view of the magnetically stabilized cross-flow contactor showing solids regeneration and return of solids to the magnetically stabilized cross-flow contactor.

As indicated previously, the present invention relates to a magnetically stabilized cross-flow gas-solids contacting apparatus which includes:

(a) a chamber including an inlet port and an outlet port for introducing and removing solid, discrete magnetizable particles;

(b) a solenoid or magnet means for establishing a magnetic field within said chamber; and (c) a plurality of openings in said chamber arranged on substantially opposite sides of the chamber and being situated in such a manner as to permit gas to flow with a velocity component substantially perpendicular to the external force field (e.g., gravity) within said chamber and substantially transverse with respect to the applied magnetic field. The openings in the chamber are preferably encased by plenum means which transport the gas to and from the openings in the chamber. The plenum means will include a gas inlet plenum communicating with the opening means on one side of the chamber and the other plenum, a gas outlet plenum, communicates with the opening means on the opposite side of the chamber.

The chamber may be annular, or, alternatively, may comprise one or more pairs of substantially upwardly extending horizontally spaced-apart perforate retaining walls, one of which is in communication with the gas inlet plenum and the other of which is in communication with the gas outlet plenum.

The openings on the chamber will preferably include a plurality of support members, each of which are adjacent to the openings and in communication with the gas inlet plenum. The support members are arranged to extend outwardly from below their adjacent openings and into the inlet plenum to support and expose to the chamber a plurality of free surfaces of particulate material. They are arranged cooperatively to support the solid, discrete magnetizable particles and retain the particles within the contacting chamber. A similar arrangement of outwardly extending support members, each of which are adjacent to the openings and in communication with the gas outlet plenum, will be positioned opposite the inlet plenum.

Both of these outward extending support members (louvers) are preferably inclined at an upward angle to enable higher gas velocities to be employed without blow-out of the solids. The angle of incline will vary, depending on the gas velocity, size and shape of the particles, and the magnetization of the particles (as induced by the applied magnetic field). The support members or louvers may be of special design to facilitate air flwo into and out of the chamber as well as provide support for the magnetizable particles. For example, the support members may be arranged to extend outwardly and downwardly in a general curve from below their adjacent opening and then extend further in a general curve upwardly and into the chamber. The edge of such support may be either above the inner edge of the free surface supported by the member or, when below, a line drawn through these edges is inclined at an angle of less than about 60° to the horizontal, preferably less than 45° to the horizontal.

The chamber most suitably comprises a plurality of perforate panels joined end-to-end to one another and folded back as in the pleats of an accordian as shown in the cross-sectional top view in FIG. 6. This arrangement provides maximum contacting volume per unit of space required for efficient contacting and also maximizes use of the electromagnetic coils surrounding the chamber.

The thickness of the contacting chamber is preferably kept as small as possible to minimize the pressure drop of gas passing through the bed. The thickness will be a function of the needed contact time and allowable pressure drop. Generally, the thickness of the chamber retaining the solid, discrete magnetizable, fluidizable particles will be in the range from about 1 inch to about 2 feet, preferably from about 2 to about 12 inches and, more preferably, from about 4–10 inches thick. The height of the contacting chamber may vary substantially depending on space available, volume of gas to be processed, etc. Typically, the height may range from 1 ft. up to as high as 80 or 100 ft. However, a commercial unit may typically be 10 to 60 ft., or 25 to 50 ft. high.

In designing the perforate chamber walls it is preferred to provide a seal zone above and below the openings in the chamber, i.e., zones where no openings exist as shown in FIG. 4. The seal zones prevent the gas from leaking upward or downward within the chamber containing magnetizable solid particles.

The magnet means for magnetizing the solid, discrete magnetizable particles within the chamber is generated by a plurality of solenoid or electromagnetic coils which surround the contacting chamber. The coils are preferably arranged in such a manner that they establish a magnetic field substantially colinear with the external force field (e.g., gravity) and substantially perpendicular to the flow of gas through the bed of magnetized solid particles. The magnetic field is preferably established by two or more electromagnet coils of circular or semi-rectangular toroidal form positioned around the outer wall of the apparatus. The magnetic field is preferably substantially uniformly applied to at least a portion or a zone of the chamber containing the solid, discrete magnetizable particles. Preferably, the magnetic field is imposed on at least the region or regions where the openings in the vessel exist and most preferably the entire chamber. In any event, it is preferred that the region stabilized by the applied field has a variation of its vertical magnetic component less than exceed 25% of the average vertical component over the region or zone of the chamber containing the solid, discrete magnetizable particles. More preferably, the magnetic field intensity will vary no more than 10% and more preferably no more than 5% over the stabilized region. Often, it will be deemed desirable to design such regions or zones to have only about a 5% or less variance.

In many processes it will be desirable that the entire chamber(s) be stabilized by the magnetic field. In such cases, the entire bed of solids can be controlled. Thus, when the magnetic field is applied having a substantial vertical component to stabilize the solids medium, the variation of the vertical component of the magnetic field to the mean field in the bed should be no greater than 10%. Often, such chambers will be designed to have less than 5% variation over the mean. Such uniform fields have the greatest tendency to form a homogeneous, yet anisotropic, bed.

The electromagnet coil may be energized by direct current (DC) or alternating current (AC); however, DC, i.e., nontime varying, vertical fields are preferred since they are able to provide a uniform field with the lowest power requirements. If desired for special purposes, one may employ a spatially uniform DC field having a superposed AC component. Such an arrangement will behave substantially like a DC field if the DC field intensity is substantially greater than the amplitude of the AC field intensity.

The intensity of the required magnetic field will vary greatly, depending on the magnetization properties of the solid, discrete, magnetizable particles, the degree of magnetization of the particles desired, i.e., how fluid, stiff or locked, one wishes the particles. However, the applied magnetic field will generally range from about 25 to about 1000 oersteds ($2.5 \times 10^{-4}$ to $1.0 \times 10^{-1}$ Tesla), preferably from 50 to about 500 oersteds, and more preferably from 100 to about 300 oersteds.

The solid, discrete, magnetizable particles to be used in the practice of the invention are preferably particles having a low or zero coercivity to facilitate solids handling external to the magnetized contacting chamber. Ferromagnetic and ferrimagnetic substances, including but not limited to magnetic $Fe_3O_4$, $\gamma$-iron oxide ($Fe_2O_3$) ferrites of the form $XO \cdot Fe_2O_3$, wherein X is a metal or mixture of metals such as Zn, Mn, Cu, etc.; ferromagnetic elements including iron, nickel, cobalt and gadolinium, alloys of ferromagnetic elements, etc., may be used as the magnetizable solid particles. Nonmagnetic materials may be coated with and/or contain dispersed therein solids having the quality of ferromagnetism. For example, composites of magnetizable solid particles prepared for use in some catalytic processes may contain from 2 to 40 volume percent and preferably 5 to 20 volume percent and more preferably 10 to 15 volume percent of the ferro- or ferrimagnetic material and the balance will be comprised of nonmagnetic material. Often it will be desirable to use a ferro- or ferrimagnetic composite with a nonmagnetic catalytic material. The bed solids in the chamber containing the magnetizable particles may also include particulate solids which are nonmagnetizable. In other processes, for example, where high magnetization is desired, it will be desirable to use 100% ferro- or ferrimagnetic solids.

The solid, discrete, magnetizable particles are most preferably composite magnetizable particles disclosed in any of copending application Ser. Nos. 943,384; 943,385; 943,552; 943,553; or 943,554, filed Sept. 18, 1978, the disclosure of which are incorporated herein by reference. U.S. Ser. No. 943,384 to R. E. Rosensweig discloses magnetizable compositions comprising geometrically elongate particles constituted of composites of nonferromagnetic solids and elongate ferromagnetic inclusions, particularly compositions wherein the inclusions are parallelly aligned in the direction of the major axis of the particle. These particles preferably have high L/D ratio, i.e., at least 2:1, and preferably 4:1 and more preferably 10:1 and more. These elongated particles have demagnetization coefficients significantly less than $\frac{1}{3}$. These elongated particles are capable of aligning along the lines of the magnetic field in a more oriented manner than spherical particles. U.S. Ser. Nos. 943,385 and 943,554 disclose a method for parallelly aligning orienting elongate ferromagnetic inclusions in an admixture of a hydrogel precursor and said elongate inclusions prior to gelation, and maintaining such alignment or orientation of the ferromagnetic particles during gelation which takes place in a hot oil bath. U.S. Ser. No. 943,552 discloses (i) particulate admixtures of nonferromagnetic solids and elongate ferromagnetic solids; (ii) composites comprising particulates constituted of nonferromagnetic solids and a single elongate ferromagnetic inclusion; (iii) composites comprising particulates constituted of nonferromagnetic solids and a plurality of elongate ferromagnetic inclusions wherein the long sides of the inclusions are parallelly aligned and (iv) processes of using any of (i), (ii) or (iii) for fluids-solids contacting. U.S. Ser. No. 943,553 discloses composite particles constituted of nonferromagnetic solids and a plurality of elongate ferromagnetic inclusions randomly aligned as well as process for using the compositions for fluid-solids contacting.

In processes where very high temperatures will be encountered, it is preferred that materials having a high Curie point be employed. Examples of such materials useful for this purpose are disclosed in U.S. Ser. No. 000,384, filed Dec. 29, 1978 to R. C. Krutenat and Chih-an Liu, the disclosure of which is incorporated herein by reference. In this application, a base magnetic metal such as iron or cobalt is alloyed with aluminum, chromium, silicon or combinations of these materials (and optionally, Y, Hf, Zr or La can be incorporated) and air oxidized at elevated temperatures.

Generally speaking the size of the solid, discrete magnetizable particles will be such that their mean diameter ranges from about 100 to about 1500 microns, preferably from 150 to about 1000 microns and more preferably from about 250 to about 500 microns. The particle size range referred to herein is that determined by the mesh openings of a first sieve through which particles pass and a second sieve on which the particles are retained.

The solid, discrete magnetizable fluidizable particles may be admixed with nonmagnetic materials. For example, silica, alumina, metals, e.g., copper and salts thereof, catalysts, coal, etc., may be admixed with the magnetizable particles and the advantages of the present invention still obtained. In the case of admixtures (as opposed to composite materials containing the magnetizable particles) it is preferred that the volume fraction of magnetizable particles exceed 75 percent, or preferably exceed 90 volume percent of the total particles. Normally the bed will be composed of 100 volume percent of the magnetizable particles (i.e., it will not contain admixtures of other materials). When the nonmagnetizable admixtures exceed 25 volume percent, the particle mixtures may separate analogous to liquids of limited solubility.

An important factor in selecting or preparing the solid magnetizable, particles is the magnetization M, of the particle. The higher the magnetization, M, of the particle, the higher the superficial fluid velocity and the better the contacting the particulate capture efficiency, etc., at which one may operate the contacting device of the invention without blowout or entrainment of solids by the crossflowing gas stream, all other factors such as particle size and distribution being held constant. The magnetization of the solid, discrete magnetizable particles in the bed within the contacting chamber will have a magnetization M of at least 10 gauss. Generally, for high fluid velocities the particles will have a magnetization, as being imparted by the applied magnetic field, of at least 50 gauss, preferably at least 100 gauss and more preferably at least about 150 gauss, e.g., 150-400 gauss. For those processes requiring very high fluid velocities, the magnetization of the particles may be up to about 1000 gauss or more. In some instances it will be desired to create a degree of magnetization on the particles such that they form a stiff mass or lock-up within the contactor vessel, rather than allow the particles to flow in a downward motion by the action of gravity. It will be realized that one aspect of the instant invention pertains to controlling the rate of descent of the particles simply by the application of the applied magnetic field. Thus, the applied magnetic field can control the rate of flow of the particles, the voidages in the bed, gthe gas velocities at which the system one can operate and the relative efficiency of the gas-solids contacting process.

The magnetization, M, of the particles, as is well-known, is defined as B-H in the particle, where B is the magnetic induction and H is the magnetic field, the fields being defined in standard published works in electromagnetism, e.g., *Electromagnetic Theory*, J. A. Stratton, McGraw-Hill (1941). The value of M may be measured in a variety of ways, all of which give the same value M since M has an objective reality.

One means for determining magnetization M of the particles in a bed under the influence of a given applied magnetic-field is to measure their magnetic moment at that field in a vibrating sample magnetometer under conditions of similar voidage, sample geometry and temperatures as exist in the process to be used. The magnetometer gives a value of $\delta$, the magnetic moment per gram from which magnetization M is obtained from the formula:

$$M = 4\pi\rho\sigma$$

where $\rho$ is the density of the particles in the test samples, $\sigma$ is the magnetic moment in emu/gm (electromagnetic units per gram), M is the magnetization of the particles in gauss at the applied magnetic field used in the test and $\pi$ is 3.1416 ... a well-known physical constant.

The actual magnetization of the particles in the contacting chamber will be a function of the particles themselves (i.e., the degree of magnetizability they inherently possess) and the intensity of the applied magnetic field. It is to be understood that the term "applied magnetic field" used throughout the specification and claims refers to an empty chamber or vessel applied magnetic field.

As stated above the magnetizable particles should have a certain degree of magnetization M which is imparted to the particles by the intensity of the applied magnetic field. Obviously one would seek the lowest applied magnetic field possible because of cost. Commonly, many of the composite particles referred to in the above-mentioned patent applications will require at least 50 oersteds, more often more than 100 and preferably less than 1000 oersteds applied magnetic field to achieve the requisite magnetization M. The determination of the applied magnetic field will take into account the type of particles employed, i.e., their magnetization, particles size and distribution, the superficial fluid velocity to be used, etc.

Generally, the magnetization M of a particle as obtained from a magnetometer when a given magnetizing field $H_a$ is applied will not provide a value which is the same as the magnetization of the particle in response to the same intensity of magnetic field in the contacting chamber to be used in accordance with the teachings of the present invention.

The purpose of the following is to indicate a method for determining the magnetization $M_p$ of a typical particle in a bed from those values obtained from a magnetometer. Generally, this will require a calculation since the effective field that a bed particle is subjected to depends on the applied field, the bed geometry, the particle geometry, the bed voidage and particle magnetization. A general expression has been derived to relate these quantities based on the classical approximation of the Lorentz cavity that is employed in analogous physical problems such as the polarization of dielectric molecules.

$$H_a = H_e + M_p [d_p + (1-\epsilon_o)(d_b - \tfrac{1}{3})] \quad (1)$$

$H_a$ is the applied magnetic field as measured in the absence of the particles, $H_e$ the magnetic field within a particle, $M_p$ the particle magnetization, $d_p$ the particle demagnetization coefficient, $\epsilon_o$ the voidage in the bed, and $d_b$ the bed demagnetization coefficient. The term $-\tfrac{1}{3}$ is due to the magnetizing influence of a (virtual) sphere surrounding the bed particle.

The expression above applies as well to a sample of particles such as used in a magnetometer measurement. In that case $d_b$ is the demagnetization coefficient $d_s$ corresponding to shape of the cavity in the sample holder.

Magnetometer measurement produces a graph of $M_p$ vs. $H_a$. Using the above equation and known values of $d_p$, $d_s$, $\epsilon_o$, $M_p$ and $H_a$ a corresponding value of $H_e$ may be computed. When the value of $H_e$ is small its value found in this manner is determined by a difference between large numbers, hence is subject to cumulative errors. Accordingly, a modified approach is useful as described in the following.

Thus, it is useful to define a reference quantity $H_s$ representing the calculated field in a spherical cavity at the location of the particle. It is imagined that the magnetization of surrounding particles is unchanged when the said particle is removed.

$$H_s = H_a - M_p[(1-\epsilon)(d_b - \tfrac{1}{3})] \quad (2)$$

Combining the two expressions gives an alternate relationship for $H_s$, in which $H_a$ is eliminated.

$$H_s = H_e + M_p d_p \quad (3)$$

The expression is recognized to give $H_s$ as the change of field in passing from the inside of a particle to the outside of the particle.

Denoting $K_m$ as the following constant $$K_m = \frac{1}{(1-\epsilon_o)(d_s - \tfrac{1}{3})} \quad (4)$$

then from (2) $K_m$ equals the quantity $M_p/(H_a - H_s)$ i.e., $$K_m = \frac{M_p}{H_a - H_s} \quad (5)$$

Thus, on the graph of $M_p$ vs. $H_a$ straight lines of slope $K_m$ intersecting the measured curve and the $H_a$ axis relate corresponding values of $M_p$ and $H_s$. For example, when the sample is contained in a spherical cavity, $d_s = \tfrac{1}{3}$, $K_m$ is infinite and $H_s$ equals $H_a$. For a long sample such that $d_s = 0$, $K_m$ is negative and $H_a$ is less than $H_s$ i.e., the field magnetizing a particle of the sample is greater than the field applied to the sample.

Additionally, for a process bed, a constant $K_p$ may be defined as follows:

$$K_p = \frac{1}{[(1-\epsilon_o)(d_b - \tfrac{1}{3})]} \quad (6)$$

It may also be seen from Eq. (2) that a line of slope $-K_p$ passing through a point $H_a$ on the horizontal axis of the graph of $M_p$ vs. $H_s$ intersects the curve on the graph at a value of $M_p$ giving the particle magnetization in the bed. Thus, the particle magnetization $M_p$ in a process bed has been related to the field $H_a$ applied to the process bed.

The relationship of Eq. (1) is an approximation which is more accurate for beds having high voidage than for very densely packed samples.

The superficial fluid velocity employed in operating the magnetically stabilized cross-flow contactor may be regulated to vary over a wide range of superficial fluid velocities. However, the superficial fluid velocity should be insufficient to cause substantial entrainment of the smaller bed particles in the exit gas stream or insufficient to cause "solids blow-out". Solids blow-out occurs at a relatively low superficial fluid velocity in unstabilized cross-flow contactors. The application of the magnetic field, in the case of the magnetically stabilized cross-flow contactor enables one to use substantially higher superficial fluid velocities before substantial solids entrainment or solids blow-out. The superficial fluid velocity sufficient to cause substantial entrainment of the smaller bed particles in the exit gas stream may be insufficient to cause "solids blow-out". The superficial fluid velocity sufficient to cause solids blow-out is the superficial fluid velocity at which the solids suddenly (catastrophically) exit through the gas exit openings of the contactor. This occurs when the aerodynamic drag on the bed by the gas flow exceeds the retaining forces which derive from the particle-to-particle coupling due to the magnetic field and from the physical barrier provided by the gas exit openings' inner surfaces. Thus, the magnetization of the particles in the bed and the size of the gas exit openings are interrelated in determining the maximum superficial fluid velocity that can be tolerated before solids blow-out occurs. Unlike the unstabilized cross-flow contactors of the prior art, the blow-out superficial fluid velocity in the case of the instant magnetically stabilized cross-flow contactor can be controlled by appropriate magnetization of the particles (e.g., by increasing the applied magnetic field).

While not wishing to be bound by any theory, the blow-out velocity may be represented in the following terms at blow-out:

$$\text{Drag Force} = K_1(\text{weight}) + K_2(\text{magnetic force}) \quad (1)$$

$$\frac{C(A_p)\rho_f U^2}{2 g_c} = K_1(\text{Vol. P})\rho_p + K_2(M_p)(\text{Vol. P.}) \quad (2)$$

Where: $A_p = \frac{\pi D_p^2}{4}$ = drag area of the particle

Vol. P. $= \frac{\pi D_p^3}{6}$ = volume of particle $D_p$ = Diameter of perticle
$\rho_p$ = Density of particle
$M_p$ = Magnetization of particle
$U$ = Gas velocity through louvers
$\rho_f$ = Density of fluid (gas)
$\mu_f$ = Viscosity of fluid (gas)
$g_c$ = Gravitational constant
$K_1, K_2$ = Constants fixed by bed enclosure design, e.g., louver spacing
$C$ = f(Re) and for $2 \leq \text{Re} < 500$
$= 18.5 \left( \frac{\mu_f}{D_p U \rho_f} \right)^{0.6}$ solving ($2 < \text{Re} < 500$):
$U = K_3 D_p^{1.14} (K_1 \rho_p + K_2 M_p) 0.714$
Where: $K_3 = \frac{4.1}{\mu_f^{.43} \rho_f^{.286}}$ Typically, by use of magnetizable particles having an average mean diameter of 300 microns, a contactor 1–12 inches thick having gas exit openings of ¾ inches and an applied magnetic field ranging up to 1000 oersteds, the superficial fluid velocity at the face of the contactor may be as high as 10 ft./sec. (i.e., 300 cm./sec.). Generally, the superficial fluid velocity at which blow-out will occur will to 6 ft./sec. and more often 1.5 ft./sec. to 4.5 ft./sec.

The pressure drops encountered by operating the contactor of the invention is generally quite low. It will generally be less than 2–3 inches/inch of bed, more preferably less than 1–2 inches/inch of bed.

DETAILED DESCRIPTION OF THE DRAWINGS

In the several figures, the like reference numerals refer to like parts having like functions. In FIG. 1 the magnetically stabilized cross-flow contactor comprises a casing 1 (preferably nonmagnetic, not shown) and a contacting chamber 2 (preferably nonmagnetic) which contains a plurality of solid discrete magnetizable particles 6. The particles are supplied to chamber 2 via port 14 and exit chamber 2 via port 16. The particles are magnetized by magnet means 4 comprising a plurality of electromagnetic or solenoid coils coaxially surrounding chamber 2. These coils may be energized by DC or AC current. It is preferred to employ nontime varying fields colinear to the external field (i.e., gravity). Direct current (DC) rather than alternating current (AC) is preferred to energize the electromagnetic coils because it requires less power than the AC energized electromagnetic coils. The gas to be treated from any suitable source (not shown) flows through conduit 10 (not shown) and into chamber 2 via a plurality of openings 8. The gas passes through the magnetized particles 6 in a generally cross-flow manner (i.e., perpendicular to gravity and the applied magnetic field) and exits the chamber 2 through a plurality of openings 9. The processed gas may then be transported from the contactor via conduit 12 (not shown).

FIG. 2 is a left-side perspective view of the magnetically stabilized cross-flow contactor as shown in FIG. 1, which additionally includes a plurality of panel type louvers for the entry and exit of the gases to be contacted in the contactor. As shown, the solids 6 enter at 14 into contactor 2. The bed of magnetizable particles 6 moves down through the contactor 2 in a controlled manner while under the influence of the magnetic field 4a created by the magnet means (not shown). The gas from a suitable source, not shown, enters an inlet means 10, not shown, and passes by the panel louvers 8a into the openings 8 into the contactor 2. The gas exits through the openings 9 and the solids particles are retained in contactor by the action of the magnetic field and the upwardly extending panelled louvers 9a, whereupon the gas is withdrawn via gas outlet 12 (not shown).

FIG. 3 is a cross-sectional view of the right half of an annular design using the cross-flow contactor of FIG. 1, which additionally includes inlet 18 and outlet 20 plenums for the contactor. FIG. 3 also shows a plurality of panelled louvers each adjacent the openings means 8 and 9 in communication with the gas inlet plenum 18 and gas outlet plenum 20. These louvers are arranged to extend outwardly from below their adjacent openings and into the inlet or outlet plenums to expose to the contacting chamber a plurality of free surfaces of the solid particles. The panelled louvers are arranged cooperatively to support the solid, discrete, magnetizable particles and retain the particles within the contacting chamber 2. The upward angle of the support members will preferably be adjusted based on the angle of repose of the magnetized particles within the contactor 2. Obviously, this will depend on the size and shape of the particles, the degree in which they are magnetized, the size of the openings 9 and the superficial velocity of the gas passing through the contactor 2.

FIG. 4 illustrates a cross-sectional view of another embodiment of the invention as shown in FIGS. 1, 2 and 3. In FIG. 4 it is shown that the gas to be contacted enters port 10 whereupon it enters into a common inlet plenum 18. The gas from plenum 18 then enters the openings 8 in the pair of substantially upwardly extending horizontally spaced-apart perforate retaining walls into the contacting zone 2, whereupon the gas exits through opening means 9 into the outlet plenum 20. Adjacent to the openings 8 and 9 are louvers 8a and 9a. The effluent gas from the outlet plenum 20 then is suitably transported from the contactor via port 12. The magnetizable particles 6 pass downwardly through the contacting vessel 2 first passing through a seal zone 36 which acts to prevent gas from leaking upward into vessel 2 and then into cross-flow zone 34. The porosity or voidage in the bed, the velocity of descent of the particles and the relative magnetization M of the particles themselves is controlled by the applied magnetic field from the magnet means 4 coaxially surrounding the vessel 1. The magnetizable particles may be caused to move downward in a continuous, semicontinuous or batch-wise manner simply by the control of the valve means above and below vessel 1 designated as valve 32 and valve 22. The valve means may be any suitable valve, but may include an electromagnetic valve such as disclosed in U.S. Pat. No. 3,067,131 to Bergstrom. The angle of the exit region 16 of the contacting vessel 1 is such that the magnetizable particles do not substantially stick to the sides of the vessel as they flow downward. As shown in FIG. 4, the particles suitably pass through valve 22 into conduit 24 whereupon they are preferably passed through a solids regenerator 28. From time to time solids may leak from louvers 9a into outlet plenum 20 and these solids are suitably removed by conduit 26 into conduit 24 for further processing. The regenerated solids from solids regenerator 28 may then be recycled to contactor 2 via valve 32 and conduit 14.

FIG. 5 illustrates a combination cross-flow (radial flow) -raining solids contactor for countercurrent contacting of gas and solids which also has the capacity of removing particulates entrained in a gaseous stream in an expanded dense bed cross-flow region 34a. The contactor of FIG. 5 possesses a raining solids reactor/contactor zone 36a. The contactor/reactor scheme shown in FIG. 5 is a cross-sectional schematic representation of a contactor/reactor and process for carrying out simultaneously sulfur oxide and particulate removal using a magnetic sulfur oxide absorbent.

Referring to FIG. 5, the gas to be processed, e.g., a flue gas containing sulfur oxides, nitrogen oxides and entrained particulates enters gas inlet 10 and into plenum 18 at the bottom of the contactor. Ammonia and air are injected into the gas stream to convert the nitrogen oxides to nitrogen and water. The flue gas enters on the inside of an annular conic section 18. The dirty flue gas passes in a cross-flow or radially through the annular section 2a through openings 8 having louver means 8a and out of openings 9 past louver means 9a and the cleaned gases then pass into a plenum chamber 20. The contactor is coaxially surrounded by electromagnetic coils 4. The magnetic sorbent particles 6 flow in a downward direction by the action of gravity and into the radial flow expanded zone 34a. The particles are preferably in a stiffened and expanded state by the action of the magnetic field generated by the electromagnetic coils. FIG. 5a illustrates a blown-up view of a portion of contactor 2a. The void fraction in the annular space 2a can be adjusted from approximately 0.35 to 0.7 depending upon the magnetic field strength of the electromagnetic coils and the cross-flow superficial gas velocity. The thickness of the annular zone 2a is designed to give the filtering efficiency and pressure drop required to remove 90-99% of the particulate matter entrained in the gas stream. From radial expanded zone 34a the gas in plenum 20 enters the raining solids zone 36a and the cross-flow transition zone 35. A fixed interface 35a is maintained between the raining solids zone 36a and the radial flow expanded zone 34a. At the interface the magnetic solids have a tendency to form tree-like structures which collapse and form a greatly expanded stiff bed which gives a very low pressure drop. The void fraction is controlled by the magnetic field at the interface. By varying the magnetic field from electromagnetic coils 4 and 4b in different regions, one is able to control the void fraction in radial flow expanded zone 34a.

The partially processed flue gas from plenum 20 then flows countercurrent to the falling solids 6 in the raining solids zone of contactor 54. This mode of processing provides an efficient cleanup of the flue gas. Simultaneously very fine particulates which escape through the cross-flow capture zone are captured by the falling magnetizable particles which have been electrostatically charged by electrostatic means 52 powered by a suitable power source 50 prior to entering the raining solids zone 36a. The processed flue gas then leaves the raining solids zone to the stack via port 12.

Still referring to FIG. 5, solids are continuously removed from the cross-flow zone via conduit 24 to maintain the interface between the two zones. The spent adsorbent particles containing fly ash are transported to the fly ash removal zone 28 where the fly ash is removed from the adsorbent particles. The fly ash is removed from the fly ash removal zone via port 28a. In the fly ash removal zone the fly ash may be removed from the magnetizable particles by various techniques such as elutriation, screening, magnetic separation, etc. The fly ash-free magnetizable particles are then transported to a countercurrent regenerator 36 optionally stabilized by electromagnetic coils 4a where the adsorbent is regenerated with a reducing gas supplied from conduit 37.

The magnetically doped particles comprises copper on magnesium oxide-stabilized $Al_2O_3$. A typical magnetic absorbent is prepared by encasing magnetic particles such as 410 stainless steel within copper-impregnated alumina. These particles will have a particle size of 10–100 $\mu$m size range. Since the sorption reaction is diffusion controlled, advantages are seen when the copper sorbent is impregnated on an alumina which has approximately 50% of its pore volume in pores >1000 Å diameter. The flue gas desulfurization catalyst particles may be regenerated by treatment in a steam and hydrogen atmosphere where the absorbed $CuSO_4$ resulting from the $SO_2$ absorption is converted to Cu, water and $SO_2$. The regenerator possesses electromagnetic field coils 4a to optionally impose a magnetic field within the regenerator. The concentrated $SO_2$ effluent from the regenerator is removed by conduit 39 for further processing, e.g., conversion to sulfur. The regenerated magnetizable catalyst particles are then returned to the top of the raining solids zone 54 via conduit 14 in a controlled manner by valve 14a where they are electrostatically charged for removing fine particulates entrained in the incoming gas. The electromagnetic field coil 4b which is coaxially positioned around the raining solids zone insures uniform distribution of the solids across the raining solids zone.

In order to enhance the effectiveness of particulate solids from the regenerator, it may be desirable to slightly cool the solids so that the solids are heated by the incoming hot flue gases as they fall through the raining solids zone. Thermal gradients increase the ability of the magnetizable particles to capture the very fine particulates. The following represents typical operating conditions for conducting the flue gas desulfurization process using the apparatus as particularly shown in FIG. 5.

| | |
|---|---|
| Contactor Temp., °F. | 650–850 |
| Contactor ΔP, inches $H_2O$ | 20–60 |
| Cross-flow contactor thickness, ft. | 0.3–3.0 |
| Cross-flow superficial force vel., ft./sec. | 1–6 |
| Raining solids vel., ft./sec. | 15–60 |
| Sorbent particle size, micron | 200–1000 |
| Sorbent Ferromagnetic, Wt. % | 10–75 |

The contactor system of FIG. 5 which has been described specifically for flue gas desulfurization can be used for a plurality of other operations where it is desirable to use a combination of long and short contact time with catalytic solids. Also, heating and cooling can be carried out in the cross-flow and raining solids zones, respectively. In addition, it is possible to carry out two reactions in the contactor of FIG. 5, i.e., one in the dense, cross-flow zone and the other in the raining solids zone.

FIG. 6 is a top elevational view of a multipanel bed contactor useful in the practice of the invention. It can be seen from FIG. 6 that the panels 2 are arranged like the pleats of an accordion. The gas to be contacted enters into plenum 18 and passes through a plurality of panels 2 containing the magnetizable particles 6 and into outlet plenum 20. The panels are encased by casing 1 comprised of a gas inlet duct in communication with plenum 18 and a gas outlet duct in communication with plenum 20. Electromagnetic coils 4 coaxially encase the unit so as to produce a substantially uniform magnetic field. The gas treating capacity of the arrangement illustrated in FIG. 6 can be extremely high, particularly in the case of tall panel beds. For example, panel beds arranged in this manner can be from 10 to 60 feet in height and occupy a space of 2 to 12 inches, preferably 6 to 10 inches wide. It will be appreciated by those skilled in the art that if one operated at a face velocity of greater than 1 ft./sec. extremely high contacting per unit volume can be realized by use of this contactor.

Figure 7:
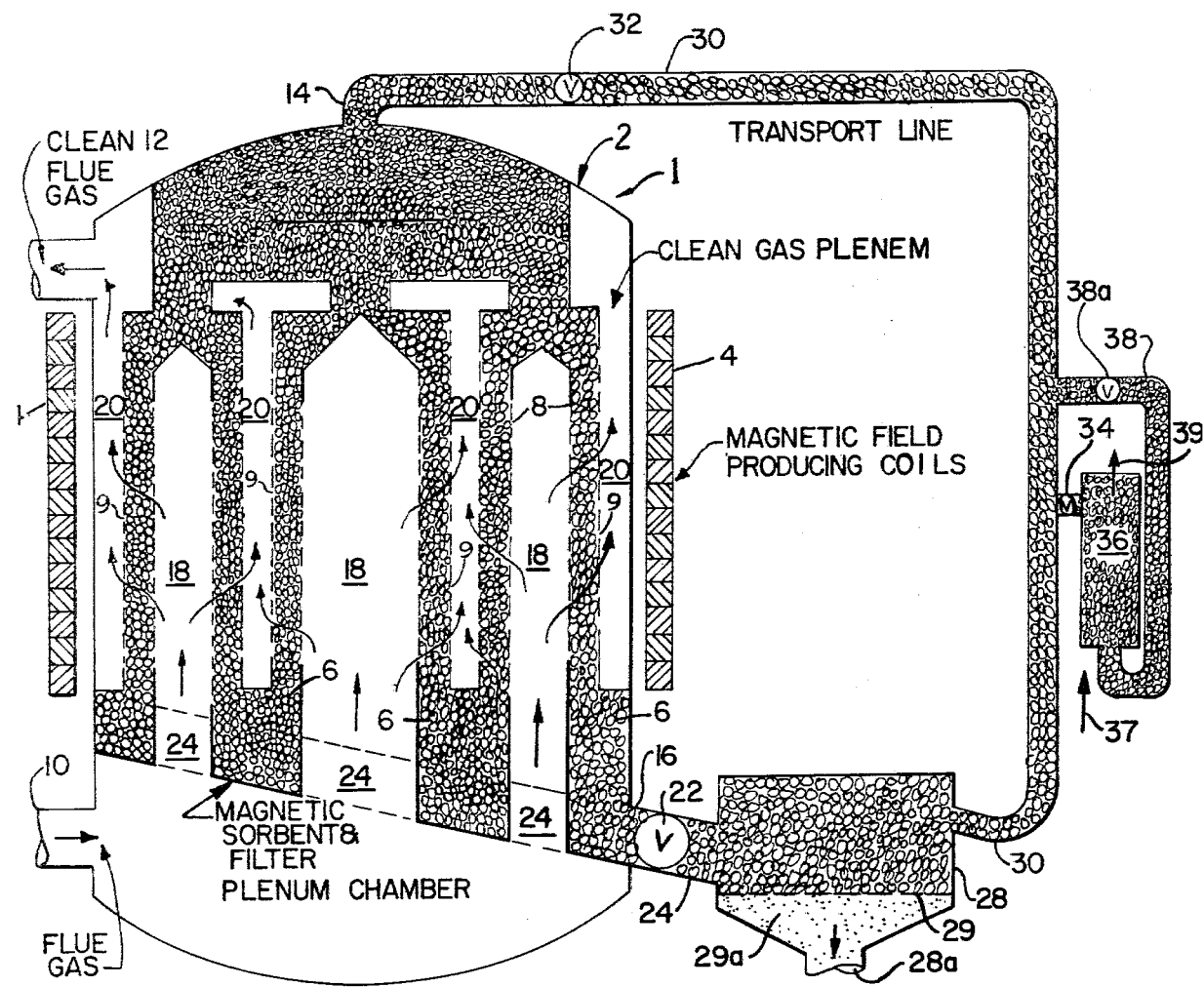
FIG. 7 is a vertical front cross-sectional view of a concentric annular design for using the magnetically stabilized cross-flow contactor which is suitable for use in flue gas desulfurization or nitrogen oxide removal processes.

FIG. 7 is a front cross-sectional schematic view of a cross-flow or panel bed contactor 1. This contactor is suitable for use in a flue gas desulfurization process and other chemical conversions. In a flue gas process the flue gas can typically enter into gas inlet plenum 18. The flue gas can then be processed by passing in a cross-flow manner into the magnetically stabilized cross-flow bed 2 through openings 8 containing the magnetizable particles 6 which are capable of absorbing $SO_2$. The clean flue gas leaves the bed of magnetizable particles through openings 9 and into outlet plenum 20 and outlet port 12. The spent magnetizable particles 6 in bed 2 are transported downward through the contactor 2 in a controlled manner via valve 22. The voidages in contactor 2 and the degree in which the particles are magnetized are controlled by the applied magnetic field from the magnet means 4. The magnetic field also prevents gas entrainment and blowout of the solids. The spent magnetizable particles are removed from the contactor 2 via conduit 16 through valve 22 and into separator 28, e.g., a fly ash vibrating screen 29. The separated fly-ash 29a can be removed by exit port 28a and the separated particles can be moved pneumatically through conduit 30 to the sorbent regenerator 36 via conduits 34 and 38 and returned to conduit 30. Treatment in the regenerator is the same as described for FIG. 5. The regenerated magnetizable particles may be used in processing fresh flue gas by control of valve 32 and allowing the particles to be transported through conduit 14 into vessel 1.

As a specific embodiment of FIG. 7, the cylindrical steel pressure vessel 1 is comprised of hemispherical heads in which there are contained three concentric chambers of 10, 11 and 15 feet average diameters and 20 feet high for a total area of 2240 square feet. The chambers are formed by perforated pipes, or pipe stubs attached to woven, nonmagnetic stainless steel cloth, and contain the magnetic particles which may vary in size from 200 to 750 microns. The magnetic particles 6 are of high surface area material and contain a suitable catalyst for the absorption of $SO_2$. This magnetizable catalyst may be 410 stainless steel particles coated with alumina which contains copper. The $SO_2$ in the flue gas is reacted with the copper and oxygen from the flue gas to form copper sulfate.

The magnetic catalyst particles, which fall vertically, in the annular gaps between adjacent perforated pipes, are maintained in an expanded, but packed, configuration by a series of magnetic coils 4 which are stacked upon each other and separated by a reasonable distance. The highly expended bed of magnetic particles should be controlled to provide a voidage fraction of 0.35-0.7, the control being made by the applied magnetic field and the gas flow rate. Since the magnetic particles are essentially "locked" to each adjacent particle by the inter-particle magnetic forces, the moving bed of particles resembles a continuous mechanical filter of adjustable voidage or porosity. The head pressure acting on the vertical columns of magnetic particles keep the particles in a downward direction to a vibrating, or oscillating screen separator 28. The particulates which have been captured by the magnetic particles are mechanically separated in separator 28. The particulate-free magnetic catalyst particles are then preferably treated in the catalyst regenerator 36 with steam, CO and hydrogen where the $CuSO_4$ is converted to CuO and $SO_2$. After the magnetic catalyst particles are rejuvenated they are transported via pneumatic means in conduit 30 to the top of the contactor via conduit 14 where they begin their downward fall, in a controlled manner, through the annular gaps which exist between the three different pipe pairs.

Operating conditions in one example using the magnetically stabilized cross-flow contactor of FIG. 7 are as follows:

| | |
|---|---|
| Flue gas flow rate: | $15 \times 10^6$ SCFH |
| Bed thickness: | 16 cm. |
| Bed particle size: | 300 microns (average dia.) |
| Particle sphericity: | 1.0 (sphere) |
| Bed voidage (expanded and magnetically locked-up): | 0.62 |
| Gas viscosity: | $1.8 \times 10^{-4}$ g./cm.sec. |
| Reactor pressure: | Nominally 1 Atm. |
| Particle Reynolds number: | <20 |
| $V_o$: | 1.86 ft./sec. |
| $\Delta P$: | 17 cm. $H_2O$ |

The pressure drop can be estimated from the following Ergun fluid dynamics relationship for pressure drops in packed beds:

$$\frac{\Delta P}{L} g_c = 150 \left[ \frac{(1-\epsilon_m)^2}{\epsilon_m^3} \right] \left[ \frac{\mu V_o}{(\phi_s d_p)^2} \right] + 1.75 \left[ \frac{\rho_f V_o^2}{d_p} \right] \left[ \frac{1-\epsilon_m}{\epsilon_m^3} \right]$$

Figure 8:
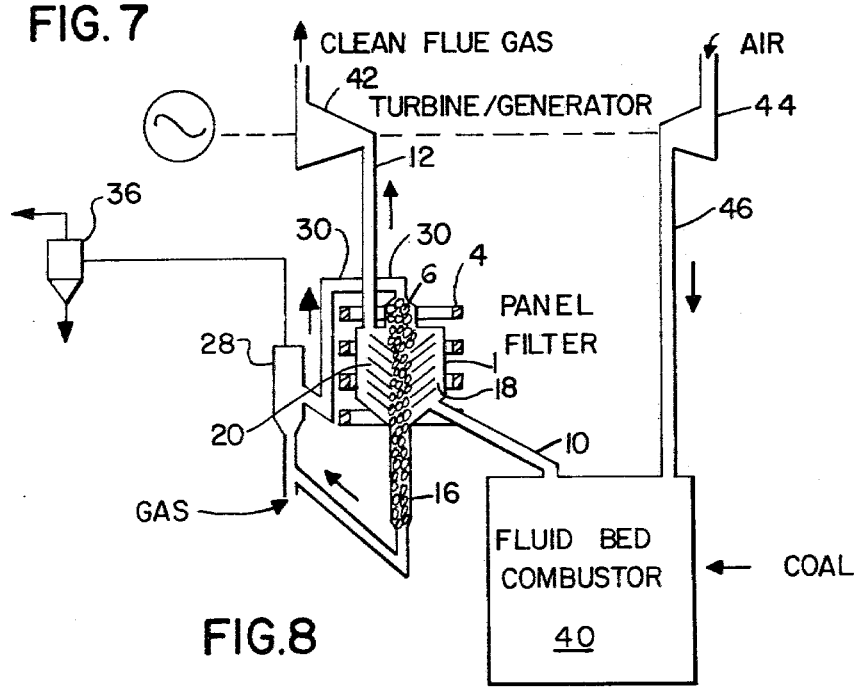
FIG. 8 is a vertical front partial cross-sectional view of the magnetically stabilized cross-flow contactor applied to a combined cycle power process.

FIG. 8 illustrates a partial cross-sectional frontal view and schematic process description of using the magnetically stabilized cross-flow bed contactor in a combined cycle power system. In such a process as shown in FIg. 8, coal is transported to a fluid bed combustor 40. The flue gas from the fluid bed combustor is passed into the magnetically stabilized cross-flow contactor via conduit 10 into plenum 18 through the magnetized particles 6 and then into plenum 20. The clean flue gas from plenum 20 exits through conduit 12 into the turbine/generator 42 (which also supplies the power to run compressor 44). Air is supplied to the fluid bed combustor through conduit 46 from compressor 44. The spent solid particles from the magnetically stabilized cross-flow contactor are transported through conduit 16 into separator 28 whereupon they are recycled to the contactor via conduit 30. The concentrated effluent from the elutriator is then further processed in cyclone 36 to remove particulate. Typical conditions for the process include processing a flue gas of 1500°–1700° F. and at pressures of 5–20 atmospheres. The flue gas contains about 1–20 grs/SCF of fly ash.

Figure 9:
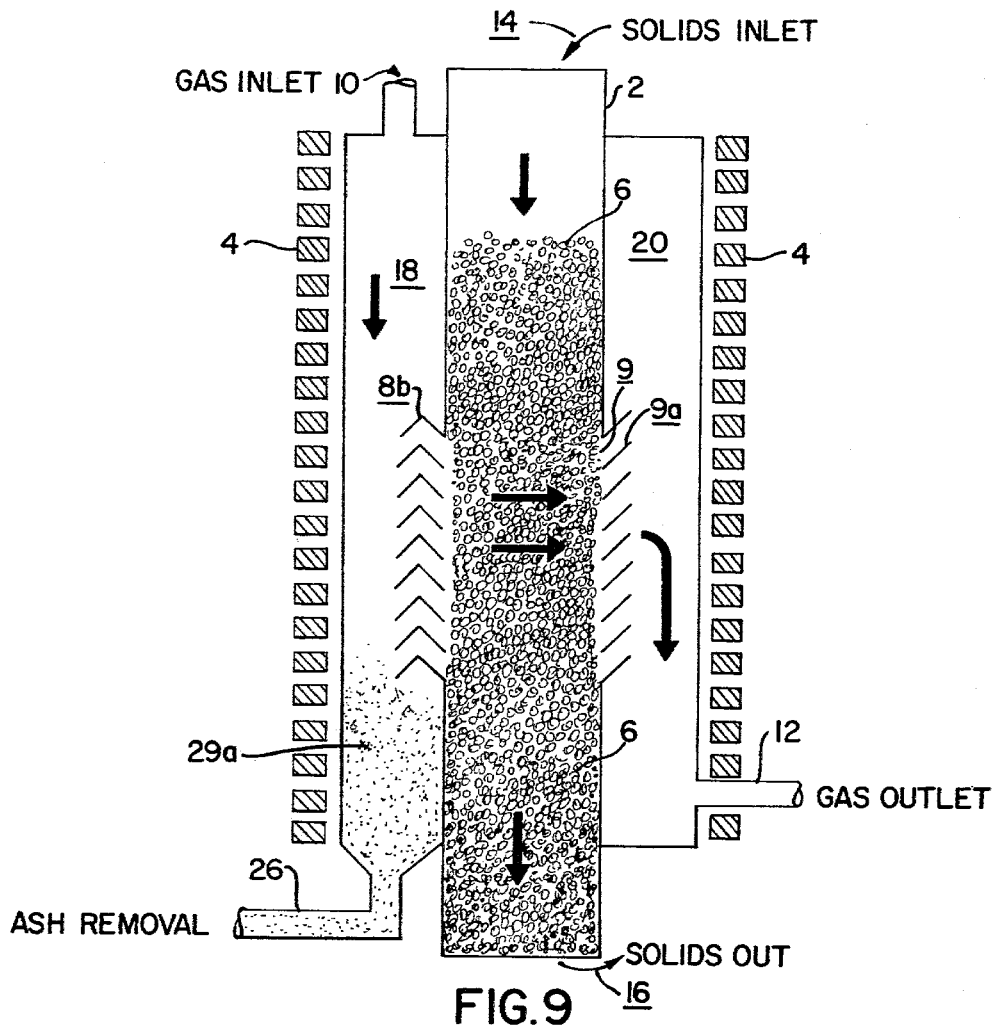
FIG. 9 is a vertical front cross-sectional view of the magnetically stabilized cross-flow contactor illustrating an improved louver design.

FIG. 9 illustrates an improved louver design of the magnetically stabilized cross-flow contactors similar to those shown in FIG. 1 to 7. In particular a "∧"-shaped inlet louver 8b is shown where the louver extending from the contactor extends outward and upwards into plenum 18 at an angle greater than about 45° to the horizontal and a portion (preferably about one-half) of the louver extends further outward and downward at an angle greater than 45° to the horizontal. This improved louver design is particularly useful when removing particulates with the magnetically stabilized cross-flow bed where uniform distribution of the gas to the moving magnetically stabilized bed, the prevention of plugging, and the achievement of very low pressure drops over the entire reactor section are desirable. Ordinarily, large particulate materials entering the bed will blind or increase the pressure drop on the inlet face of the moving column of solids within the louvers of the type shown in FIGS. 2–5. It is desirable to remove as much particulate material as possible before the particulate laden gas reaches the moving column of solids. This can be achieved by using the ∧-shaped inlet louvers which causes the gas to make a very abrupt change in path. This causes the heavy particulates to drop out of the gas and they are collected in the lower part of the inlet plenum 18. The ash from plenum 18 is removed by conduit 26. The superficial gas velocity in the inlet of the ∧-shaped louvers may range from about 2 to 15 ft./sec., the actual velocity chosen will depend upon the nature of the particulate capturing solid and the applied magnetic field.

Figure 10:
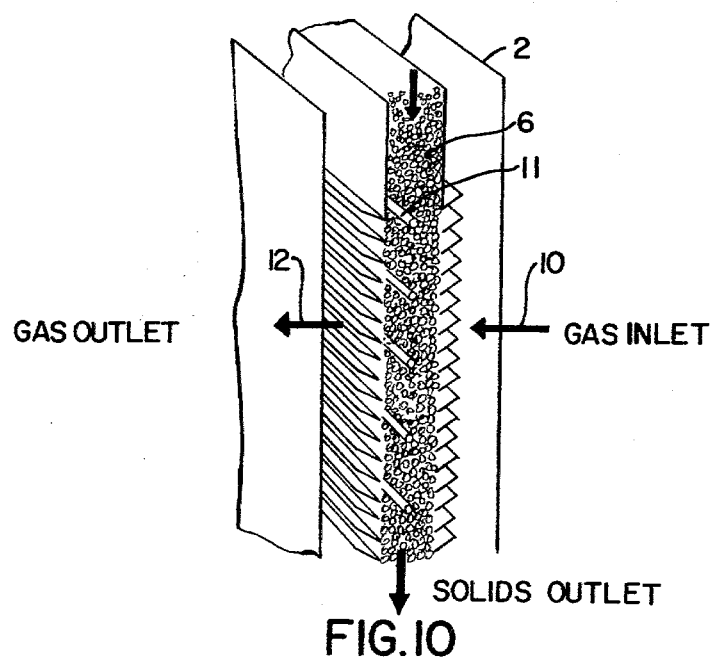
FIG. 10 is a vertical front cross-sectional view of the magnetically stabilized cross-flow contactor illustrating another louver design which includes bed particle support devices.

FIG. 10 illustrates another improved design of the magnetically stabilized cross-flow contactor. In particular, support means 11 (e.g., rods, angle irons, vertical bars, incline bars, rods on a triangular pitch, etc.) are placed near the inlet and outlet louvers and extend into the contactor containing the magnetizable solids. By proper placement of the support devices near the louver inlets and outlets, stabilization of the solids can be increased in these areas. Also, when the supports are placed in this position, the distance between the louvers can be increased substantially. This improved design is particularly useful where large panels ranging from 10 to 50 feet high and 4 to 12 inches thick will be employed. Such panel contactors will require the use of a very high column of solids moving down the panel which will generate a considerable pressure head and weight on the louvered paneled section. By use of the support means 11 shown in FIG. 10 higher gas velocities and improved solids flow can be obtained in the magnetically stabilized cross-flow beds. The support means will stabilize the solids flow and support part of the weight of the moving solids in the contactor. The support means may be ferromagnetic, weakly ferromagnetic or nonferromagnetic.

The following examples serve to more fully describe the manner of making and using the above-described invention, as well as to set forth the best modes contemplated for carrying out various aspects of the invention. It is understood that these examples in no way serve to limit the true scope of this invention, but rather are presented for illustrative purposes.

It will be understood that all proportions are in parts by weight, unless otherwise indicated.

EXAMPLE 1

This example illustrates that one can operate at substantially higher superficial gas velocities before blow-out by use of small magnetizable solids in a magnetically stabilized gas cross-flow contactor.

The contactor consists of an upstanding rectangular plexiglass container similar to that shown in FIG. 2. The contactor is 17 inches high, 8 inches thick in the direction of gas flow and 1 inch wide. The contactor contains six louvered openings on the lower 4 9/16 inch portion of the contactor. The louvers are set at 45° to the horizontal spaced $\frac{3}{4}''$ center to center measured vertically. The plexiglass louvers are about 1.4 inches long in the direction of the gas flow and 1/16 inch thick. After filling solids container 2 with the magnetizable solids it was sealed at the top and bottom. Each face of the contactor formed by the louvers is encased with plenum means 18 and 20, one of which is connected to a gas inlet source and the other means for withdrawing the gas. Pressure drop measurements were taken from the pressure taps attached to the inlet and outlet plenums at the center of each of the louver spaces.

The contactor was placed within ten magnetic coils stacked on top of each other having a internal diameter of 15.7 inches, an outer diameter of 25.3 inches and about 22 inches in height. Each coil had 270 turns of a conductor 1 inch high x 0.025 inch thick and insulated with 2 mill Mylar 1 inch wide between turns. Six mills of Mylar was positioned between the solenoid coil section and support plate. The inductance was 18.1 mH (with air core) and a resistance of 0.296 ohms. The coils were placed in a support structure. At 15 amps exitation 485 oersteds could be obtained and the oersteds/amp at the solenoid center was 32 oersteds. Each coil was separately energized with DC current (from Gates Model No. GT 14.15, manufactured by Gates Electronic Company, Inc., New York, N.Y.) to provide a uniform magnetic field in the contactor.

Figure 11:
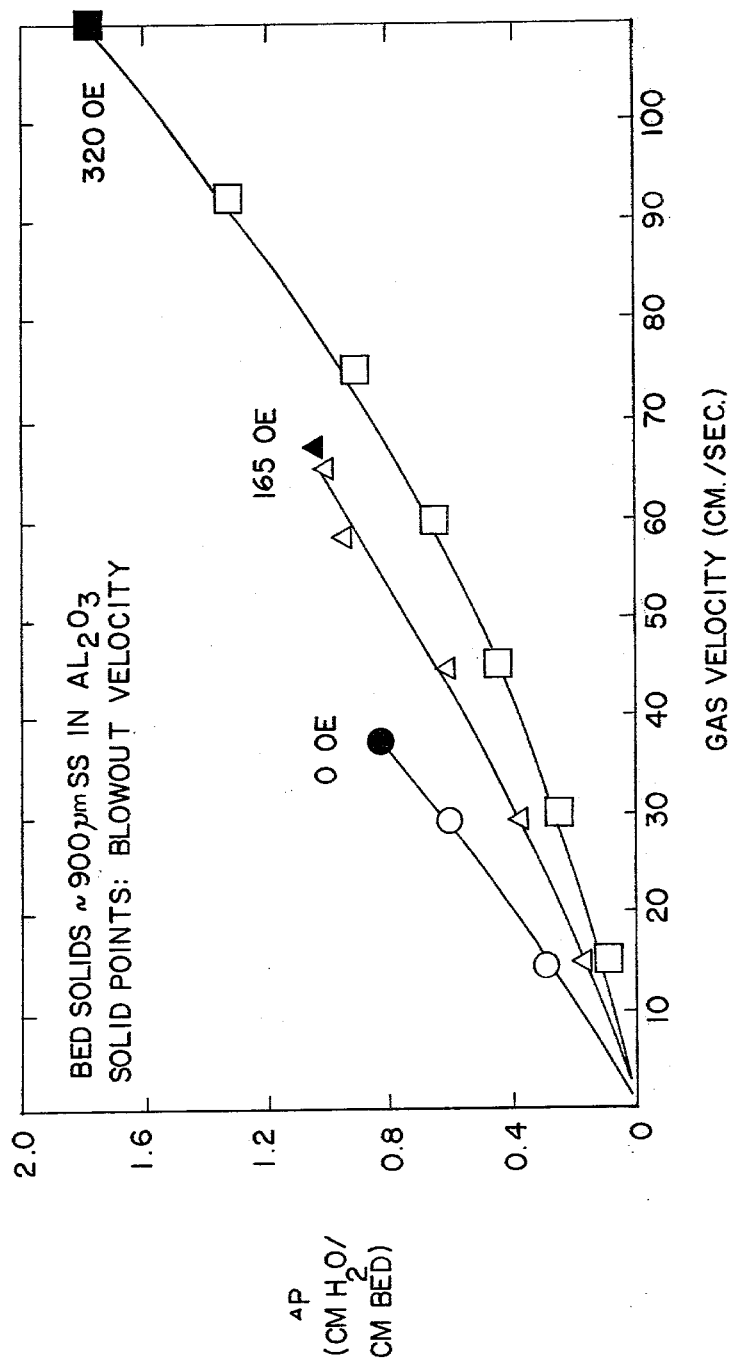
FIG. 11 graphically represents that the bed particle blow-out velocity is increased and the pressure drop resulting from a given gas flow is decreased by increasing the applied magnetic field strength in the magnetically stabilized cross-flow contactor.

The solids container of the contactor was filled to the top with magnetizable solid particles comprising 40 micron 410 stainless steel particles encased in $Al_2O_3$, the composite having an average mean diameter of about 900 microns. Air was metered into the inlet plenum and allowed to exit the outlet plenum. Pressure drop measurements were taken at various levels of superficial gas velocities. The air supply was increased starting at zero magnetic field until blow-out of solids occurred. Blow-out velocity was noted at the superficial gas velocity at which the magnetizable beads began to continuously fall into the outlet plenum. Data were taken at zero, 165 and 320 oersteds applied magnetic field. The results of the experiments are shown in FIG. 11. As shown, solids blow-out occurred at less then 40 cm./sec. superficial gas velocity with no field, whereas superficial gas velocities greater than 65 cm./sec. and 100 cm./sec. were obtainable at 165 and 320 oersteds, respectively. Also, it can be seen from FIG. 11 that, at comparable superficial gas velocities, the pressure drop (cm. $H_2O$/cm. bed)

decreased as the applied magnetic field was increased, e.g., over a 50% reduction in pressure drop.

EXAMPLE 2

This example further illustrates that higher gas velocities, before solids blow-out, can be practiced by use of the magnetically stabilized gas cross-flow contactor than with an unstabilized gas cross-flow contactor. In this example three different contactors having three different louver angles were used. Except for the angle of the louvers, the contactors were similar to the one shown in FIG. 2. Each of the contactors were 31 ¼ inches high, 3 15/16 inches thick in the direction of the gas flow and 1 7/16 inches wide. The contactors having louvers 8a and 9a at angles of 30° and 45° to the horizontal (the louvers were spaced ¾ inch center to center measured vertically) had six openings. The contact with 60° angle louvers had four louvers (with three openings) on each side of the contactor. The louvers in each of the three contactors was 1.4 inches long in the direction of gas flow and 1/16 inch thick. The open face provided by these louver arrangements was 4 ⅜ inches high in each of the three contactors. Inlet and outlet gas plenum 18 and 20 walls were spaced about ⅞ inch from the outer edge of the louvers and 1 ¼ inch from the solids retaining wall of the contactor. Pressure taps were located approximately central to the louver openings in the inlet and outlet plenums.

Tests were made using two magnetic modules for applying a field to the three contactors described above. With reference to Table I the first eight tests listed involved the use of the same field generating coil which was used in the tests involved in Example 1. The remaining sixteen tests listed in Table I utilized, for magnetic field excitation, a single solenoid winding 16.75 inches in height and comprising 16 layers of 119 turns per layer, said turns being made with No. 8 square copper wire encased in varnish impregnated insulation. The windings were connected in series-parallel combination to permit excitation by a direct current power supply having an output rating of 50 ampere maximum and 50 volts maximum. The solenoid was wound on an aluminum spool having an internal diameter of 7.75 inches.

Several blow-out velocity tests were carried out as in Example 1, i.e., placing each of the three contactors within above-described magnet modules and introducing air into the filled contactors. The following table illustrates the results of these tests which show the blow-out velocity for each of the three above-described contactors at different field strengths and particle compositions. As seen from the data in the table, the superficial velocity (both at the face of the louver and in the bed) before solids blow-out (as defined in Example 1) increases with increasing magnetic field strength.

TABLE I

| | BLOW-OUT VELOCITY DATA | | | |
|---|---|---|---|---|
| Louver Angle | Material (average particle) diameter) | Field, Oe | Blow-out Velocity, Ft./Sec. Louvers | Bed |
| 30° | Nalco[1] (950 μm) | 480 | 2.70 | 2.40 |
| 30° | Marumerized[2] (911 μm) | 0 | 0.895 | 0.796 |
| 45° | Marumerized (911 μm) | 180 | 4.77 | 3.05 |
| 45° | Marumerized (911 μm) | 165 | 3.98 | 2.55 |
| 30° | Marumerized (911 μm) | 165 | 2.00 | 1.77 |
| 30° | Marumerized (911 μm) | 314 | 4.00 | 3.56 |
| 30° | Nalco (550 μm) | 315 | 0.91 | 0.81 |
| 30° | Nalco (950 μm) | 315 | 1.81 | 1.61 |
| 45° | Marumerized (911 μm) | 620 | 10.0 | 6.4 |
| 45° | Marumerized (911 μm) | 250 | 6.80 | 4.35 |

TABLE I-continued

| | BLOW-OUT VELOCITY DATA | | | |
|---|---|---|---|---|
| Louver Angle | Material (average particle) diameter) | Field, Oe | Blow-out Velocity, Ft./Sec. Louvers | Bed |
| 45° | Nalco (950 μm) | 880 | 7.11 | 4.55 |
| 45° | Nalco (950 μm) | 690 | 6.17 | 3.95 |
| 45° | Nalco (950 μm) | 380 | 4.22 | 2.7 |
| 45° | Nalco (950 μm) | 110 | 2.42 | 1.55 |
| 60° | Nalco (950 μm) | 880 | 7.3 | 3.4 |
| 60° | Nalco (950 μm) | 690 | 6.6 | 3.1 |
| 60° | Nalco (950 μm) | 460 | 5.4 | 2.5 |
| 60° | Nalco (950 μm) | 230 | 3.3 | 1.6 |
| 60° | Nalco (950 μm) | 0 | 1.8 | 0.85 |
| 60° | Cobalt (990 μm) | 90 | 20.7 | 9.9 |
| 60° | Cobalt (990 μm) | 40 | 10.1 | 4.7 |
| 60° | Cobalt (990 μm) | 0 | 5.8 | 2.7 |
| 60° | Cobalt (347 μm) | 90 | 7.5 | 3.5 |
| 60° | Cobalt (347 μm) | 0 | 1.5 | 0.71 |

[1]Composite of 410 stainless steel particles of less than 40 μm diameter encased in Nalco alumina at a concentration of 52 wt. % stainless steel which were formed into beads of the indicated diameter by a rotating pan method.
[2]Composite of 410 stainless steel particles in Catapul alumina formed by mixing with ca. 60 wt. % 410 stainless steel particles of less than 40 μm dia. and extruding the mix through a 0.025 inch diameter die and then marumerizing the extrudates into bead form. (Marumerizer made by Elanco Products Co., a division of Eli Lilly Co.)

EXAMPLE 3

This example demonstrates that the magnetically stabilized gas cross-flow contactor is an excellent particulate capture device.

The contactor used in this experiment was identical to the contactor used in Example 2 having 45° angle louvers. The magnet modules used are described below.

The magnet modules were comprised of 12 separate coils stacked on top of one another at a spacing of about 6 cm. so that the bed could be visually observed. The coils were 20.3 cm. internal diameter magnetic modules and occupied a height of 96.5 cm. The water cooled modules were 4.13 cm. thick and 71.1 cm. outside diameter. Each module consisted of 72 turns of square cross-section copper tubing which had a circular bore and which were capable of dissipating 60 KW with a cooling water flow rate of 6.8 liters per minute. The maximum center line field strength obtained with the 12 modules connected in series was about 2200 oersteds at an applied current of 250 amperes. To prevent the magnetic field strength of the ends of the vertically arranged coils from decreasing in an undesirable manner as a function of axial distance, the modules at either end were spaced 0.63 cm. apart while the spacing between the remaining 8 modules was 6.03 cm. The two modules at either end of the stack were connected in series to separate power supplies so their current flow could be varied independently of the remaining 8 modules. The 8 centrally located modules were connected in series to a third power supply.

The contactor was filled with cobalt particles having an average mean diameter of about 900 microns. Air containing 1.7 grains/SCF of nominal fly ash particulates was passed through the magnetically stabilized cross-flow gas contactor containing the cobalt particles at a superficial gas velocity of 94.5 cm./sec. at 0, 30 and 105 oersteds of applied magnetic field. The air containing the fly ash particulates was fed to the contactor by use of a particulate feeder. The particulate feeder utilized was a grooved rotary disc feeder (BIF, Providence, R.I., the Omega model 22-01) which metered the particulates flow by varying the rotational speed of the disc. Very large changes in feed rate could be obtained by substituting a disc which had a larger groove. The rotational speed change of the disc was made possible by a 100:1 gear ratio transmission. The particulates to be fed were dropped from a 0.028 cubic meter hopper onto the rotating disc. A porous container of a moisture absorbant was hung inside the hopper, which was purged with dry nitrogen. A plow, with a protrusion machined to the dimensions of the groove, pushed the particulates off the edge of the disc. The particulates fell, under the influence of gravity, into a glass funnel located under the outer edge of the disc. The funnel was attached to the suction tap of a pneumatic syphon which was supplied with dry air. During the normal operation, a negative pressure, at the suction tap, entrained the particulate into the high velocity air jet which existed at the throat of the venturi inside the syphon. With this feeding arrangement the feed rate of particulates into the contactor was independent of the air flow rate through the syphon. The accumulation of particulates on the inner walls of the syphon and the interconnecting tube (0.95 cm. ID.) between the syphon discharge port and the particulate-air injector was prevented by the high air velocity through the system. The average air velocity in the particulate transport line between the syphon and the particulate-air injector was 119 meters/sec. The air pressure to the syphon inlet could be varied up to 344 kPa. which resulted in an air flow rate of 509 liters/min.

The particulate feeder was calibrated with 0-50 micron fly ash which was sieved from a drum of fly ash obtained from a fluidized bed coal combustor (FBCC).

The fly ash particulate feed rate could be varied from zero to 15.65 gm./min. by varying the transmission speed of the feeder. The linear plot of transmission speed as a function of fly ash feed rate was found to be reproducible within ±2% over the entire range of feed rates.

The outlet air and uncaptured particulates exited the outlet louvers to the outlet plenum. An off-gas system was connected to the outlet plenum to a combination of Balston filters. Downstream from the Balston filters the cleaned air went into an exhaust duct which was vented to the atmosphere. The entire off-gas system was fabricated from 5 cm. ID, clear polyvinylchloride pipe so that any accumulation of particulates on the walls of the pipe could be observed.

The modified Balston filters, which consisted of a fiberglass element contained in a transparent acrylic vessel were utilized to determine the gross particulate capture efficiency of the capture bed. The filters were modified by reversing the flow through them; the flow path was from the inside of the filter element to the outside. The support core for the element was removed and the element-end-seals were held in place with two elastic bands. In this manner, none of the particulates ever deposited on the inner wall of the acrylic shell. When the particle size distribution, in the range of 1.1–7.0 microns, of the off-gas stream was to be determined, the flow could be diverted by means of a two-way ball valve, for a predetermined period, through modified Anderson impactors. The Anderson impactor contained four stages and a final filter having effective cut-off diameters ranging from greater than 7 microns to less than 1.1 microns in the final filter at 566 liters/min. flow rate.

The conventional Anderson impactor was modified slightly by the additioin of a particle fractionator which limited the size of the particles impacting upon the first stage, to 11 microns. This was necessary in order to prevent overloading of the first stage with large particulates which would be re-entrained and carried over to the second stage. The maximum loading of any one stage of the Hi-Vol Anderson impactor was 0.075 gm. ±10%. If this loading were exceeded, the particle size cut off data would be questionable.

The particle fractionator which was incorporated into the impactor was designed from published data (Willeke, K. and McFeters, J., "Calibration of the Champ Fractionator," (Final Report) Particle Tech. Lab. Dept. of Mech. Eng., Minneapolis, Minn. 55455, March, 1975, Publication No. 252).

The preweighed Balston filter elements were removed and their weight change measured on a precision balance that had a sensitivity of 0.001 gm. Fly ash that had accumulated on the walls of the off-gas system was collected and weighed. The bed material, which now contained the fly ash captured after each experiment, was removed from the reactor and weighed. After weighing the bed it was necessary to separate the 0–50 micron fly ash from the 900 micron cobalt particles. This was accomplished via mechanical sieving in a vibrating sifter. The fly ash-cobalt mixture was screened through a sieve for a short period. Upon inspection of the sieve material under a microscope it was determined that all the fly ash had been removed from the cobalt. The fractions of fly ash and cobalt were weighed, a mass balance and bed capture efficiency computed.

The capture efficiency for the bed of each experiment was determined by comparing the total weight of fly ash actually fed to the contactor (a weight measurement) as determined from an ash feeder calibration curve, less the ash found in the inlet plenum, to the sum of the fly ash collected in the Balston filters and accumulated in the off-gas lines upstream of the filters. The fly ash material balance was calculated from the ratio of total fly ash fed to the contactor (obtained from a calibration curve) to the total fly ash accumulated in the bed (the fly ash was removed from the cobalt bed solids by a vibrating screen device, e.g., a Sonic Sifter), the off-gas piping and the Balston filters.

The capture efficiency was calculated by two methods:

$$\text{Capture Efficiency} = \frac{\text{Fly Ash Recovered in Bed}}{\text{Fly Ash Actually Fed to Contactor}} \quad (1)$$

$$\text{Capture Efficiency} = \frac{\text{Fly Ash Fed to Contactor} - \text{Fly Ash in Balston Filters}}{\text{Fly Ash Actually Fed to Contactor}} \quad (2)$$

In general, both methods gave similar results indicating a complete accounting for all particulates fed to the contactor.

Figure 12:
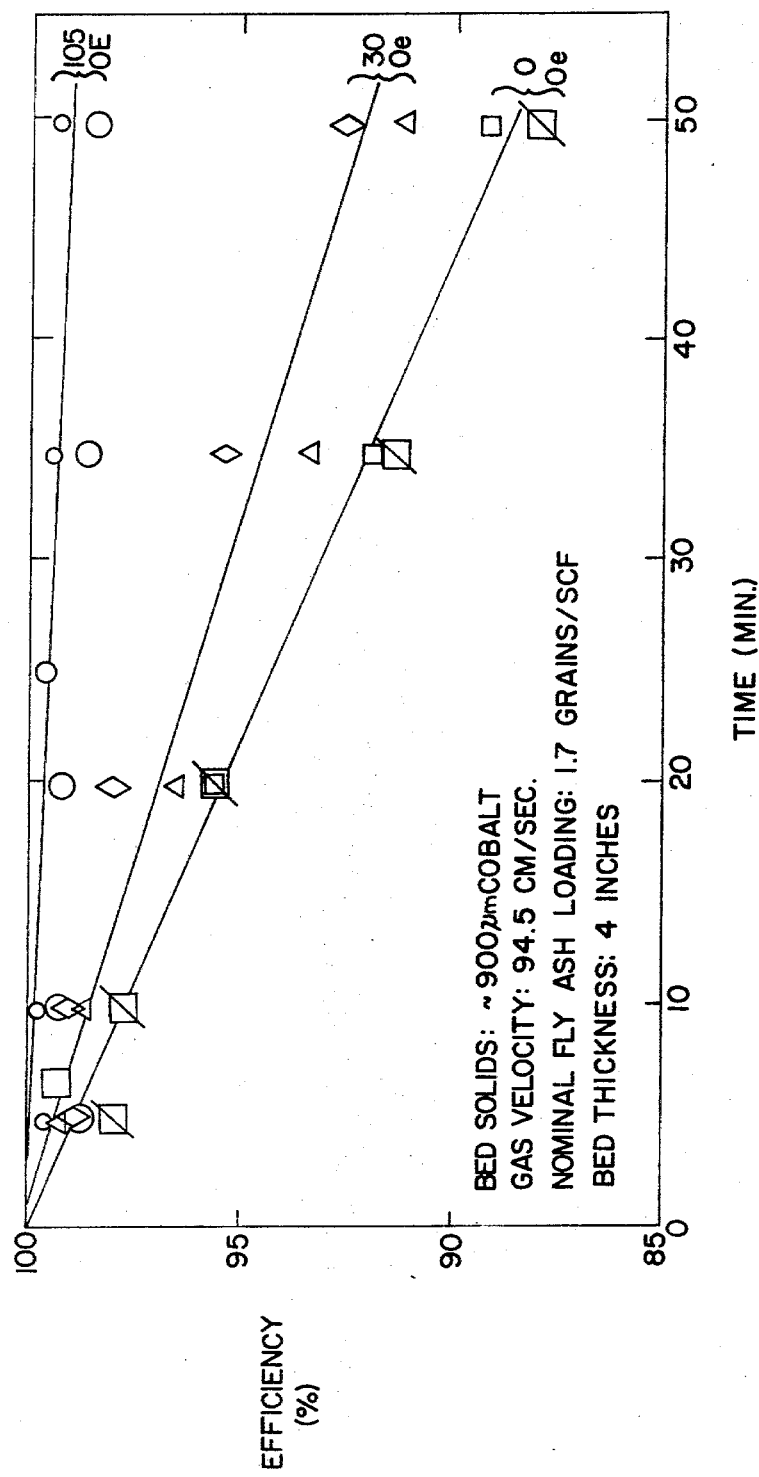
FIG. 12 graphically represents that the particulate capture efficiency in the magnetically stablized cross-flow contactor is improved by increasing the applied magnetic field strength.

The results of these static bed particulate capture tests are shown in FIG. 12 wherein the capture efficiency data is plotted against time (minutes). As shown in FIG. 12 the capture efficiency drops off very rapidly at 0 applied magnetic field. An improvement in capture efficiency occurs at 30 oersteds of applied magnetic field and a dramatic improvement in capture efficiency occurs at 105 oersteds applied magnetic field. Thus, the applied magnetic field not only enables one to use higher gas velocities before blowout, as shown in Examples 1 and 2, it also improves the capture efficiency of a gas cross flow contactor.

EXAMPLE 4

TABLE II

CIRCULATING BED RUN SUMMARIES USING ~580 MICRON $\overline{D}_p$ COBALT AS CAPTURE MEDIA <44 MICRON FBCC FLY ASH[5]

| Circulating Bed Run | Gas Velocity, Ft./Sec. | Fly Ash Loading, Grains/SCF | Bed Velocity, In./Min. | Applied Field, Oe | Run Length, Min. | $MB_A$[1] % | $MB_B$[2] % | Range of $\Delta P$ Across Bed, cm $H_2O$ | EOR[3] Cumulative Efficiencies, % | EOR Theoretical Number of Cycles |
|---|---|---|---|---|---|---|---|---|---|---|
| 1 | 2.92 | 1.42 | 1.33 | 120 | 138 | 92.17 | 99.71 | 11.5–17.5 | 99.60 | 2.9 |
| 2 | 2.92 | 5.34 | 0.96 | 100 | 147 | 108.27 | 100.43 | 13.7–29.6 | 99.84 | 2.4 |
| 3 | 2.95 | 1.78 | 4.88 | 100 | 200 | 83.51 | 99.97 | 12.6–24.0 | 99.77 | 16.7 |
| 4 | 2.82 | 5.60 | 4.66 | 100 | 210 | 94.38 | 99.58 | 18.1–21.1 | 99.95 | 16.9 |
| 5 | 2.82 | 6.22 | 4.39 | 100 | 645 | 87.65 | 99.61 | 12.7–26.1 | (4) | 49.1 |

[1]$MB_I$ = material balance on the fly ash.
[2]$MB_B$ = material balance on the cobalt.
[3]EOR = End of Run.
[4]EOR cumulative efficiency is not reported for CB-5 due to the filling of the outlet louvers with bed solids over the course of the run.
[5]FBCC = Fluid Bed Coal Combustion.

This example demonstrates that the magnetically stabilized gas cross-flow contactor can be used in a continuous manner as a particulate capture device.

The contactor and magnet modules used in this experiment were identical to the contactor used in Example 3. The contactor, however, was modified to the extent that it had a valve means above and below the contactor to control the solids input and output. The magnetizable solids (cobalt, having a mean diameter of 590 microns) were added to a solids hopper above the contactor. The contactor was filled by opening the inlet valve and closing the solids outlet valve. In operation, the solids exit the contactor through a vertical standpipe upon opening the solids opening valve whereupon the solids are transported to a solids elutriator to separate the fly ash from the solids and then pneumatically transported up a pipe to a cyclone and down into the solids hopper. In this manner the solids can be moved throughout the entire system in a controlled and continuous manner.

The tests in this example, other than the solids circulation, were conducted in a manner similar to that described in Example 3. Dried air containing fly ash was fed to the contactor by use of the rotating disc calibrated feeder. The outlet gas was fed to an "Octopus" Balston filter manifold. Table II summarizes five (5) runs using the circulating bed at 120 and 100 oersteds of applied magnetic field. As shown from the data in Table II, the following advantages are manifested by use of the solids circulating magnetically stabilized gas cross-flow bed:

Low pressure drops were maintained across the reactor throughout all the runs, i.e., pressure drops remained below 3 inches of water/inch of bed for all runs;

Increasing the fly ash (F/A) level in the inlet gas did not reduce capture efficiency;

Increasing the solids circulation rate did not reduce capture efficiency;

The data in Table III show that the instantaneous and cumulative capture efficiencies for all runs tested were greater than 99%. These high capture efficiencies were obtained even after an average of 17 theoretical cycles of the capture solids (calculated on the rate of solids movement). This evidence suggests that fly ash can be effectively removed from the bed material to prevent a subsequent reduction in capture efficiency because of fly ash reentrainment in the granular capture bed; and Fractional capture efficiencies, as obtained using an Anderson impactor, were high for all particulates greater than 1 micron. Table IV shows the fractional efficiencies of particulates for various size ranges.

TABLE III

CIRCULATING BED FILTERS DEMONSTRATE EXCELLENT PARTICULATE REMOVAL AFTER SEVERAL CYCLES

| Circulating Bed Run | Time of Run, Min. | Theoretical Number of Solid Cycles | Instantaneous, % | Cumulative % |
|---|---|---|---|---|
| 1 | 25 | 0.52 | 99.19 | 99.19 |
|   | 50 | 1.05 | 99.73 | 99.46 |
|   | 70 | 1.47 | 99.73 | 99.54 |
|   | 105 | 2.20 | 99.70 | 99.59 |
|   | 138 | 2.89 | 99.65 | 99.60 |
| 2 | 30 | 0.49 | 99.72 | 99.72 |
|   | 60 | 0.98 | 99.80 | 99.76 |
|   | 90 | 1.48 | 99.97 | 99.83 |
|   | 120 | 1.97 | 99.94 | 99.86 |
|   | 147 | 2.41 | 99.78 | 99.84 |
| 3 | 30 | 2.50 | 99.53 | 99.53 |
|   | 60 | 5.00 | 99.77 | 99.65 |
|   | 90 | 7.51 | 99.81 | 99.70 |
|   | 120 | 10.01 | 99.80 | 99.73 |
|   | 150 | 12.51 | 99.80 | 99.74 |
|   | 180 | 15.01 | 99.85 | 99.76 |
|   | 200 | 16.68 | 99.89 | 99.77 |
| 4 | 30 | 2.41 | 99.95 | 99.95 |
|   | 60 | 4.82 | 99.99 | 99.97 |
|   | 90 | 7.22 | 99.92 | 99.96 |
|   | 120 | 9.63 | 99.93 | 99.95 |
|   | 126 | 10.11 | 99.46[1] | 99.93 |
|   | 150 | 12.04 | 99.97 | 99.93 |
|   | 180 | 14.44 | 100.00 | 99.95 |
|   | 210 | 16.85 | 99.99 | 99.95 |
| 5[2] | 30 | 2.28 | 99.76 | |
|   | 90 | 6.85 | 99.87 | |
|   | 102 | 7.76 | 99.74[3] | |
|   | 162 | 12.32 | 99.88 | |
|   | 222 | 16.89 | 99.83 | |
|   | 237 | 18.03 | 99.71[3] | |
|   | 282 | 21.45 | 99.79 | |
|   | 342 | 26.01 | 99.94 | |
|   | 402 | 30.58 | 99.98 | |
|   | 462 | 35.14 | 99.98 | |
|   | 565 | 42.98 | 99.95 | |
|   | 582 | 44.27 | 99.86 | |
|   | 597 | 45.41 | 99.99[3,4] | |
|   | 627 | 47.69 | 99.94 | |
|   | 645 | 49.07 | 99.93 | |

[1]Represents Anderson impactor data.
[2]Only instantaneous efficiencies are quoted because the outlet louver chamber gradually filled during the run.
[3]Anderson impactor data.
[4]Tare weights of filter paper greater than gross weights in all but one case.

TABLE IV

FRACTIONAL CAPTURE EFFICIENCIES OF MAGNETICALLY STABILIZED GAS CROSS-FLOW BED[1]

| Size Range, Microns | Fractional Efficiencies During Theoretical Cycles 16.89 to 18.03 (in wt. %)[2] |
| --- | --- |
| >7.0 | 99.74 |
| 3.3–7.0 | 99.90 |
| 2.0–3.3 | 99.63 |
| 1.1–2.0 | 97.79 |
| <1.1 | 92.49 |

[1]Conditions: Run 5, Tables II and III.
[2]Theoretical cycle numbers were calculated based on contactor volume, the solids volumetric circulation rate, and the elapsed time after start of run.

EXAMPLE 5

The tests were carried out to determine the effects of particle size on copper utilization in a simulated flue gas desulfurization process.

One sorbent, sorbent A, was a conventional sized copper surface impregnated porous alumina prepared as described in U.S. Pat. No. 3,985,682. More particularly, sorbent A was prepared as follows: ½ inch O.D. cylindrical ring extrudates (having, ¼ inch holes) of acetic acid peptized porous alumina previously calcined for 3 hours at 1000° F. (B.E.T. surface area, about 180 m$^2$/g; a pore volume of about 0.40 cc/g) were immersed in a mixture of isomeric C$_6$ alcohols (oxo alcohols) for 1 hour. The alcohol which was used to minimize penetration of the copper containing solution during copper impregnation. The extrudates were removed from the alcohol solution, drained of excess alcohol and were then immersed in a solution of Cu(NO$_3$)$_2$.3H$_2$0 and MgNO$_3$ to provide approximately 5 wt. % Cu and 0.3 wt. % Mg on Al$_2$O$_3$ in the region actually impregnated by the CuNO$_3$ and MgNO$_3$ solution. The extrudates were permitted to remain in the solution until the alcohol was displaced to a depth of 0.035 inches by the Cu as described in U.S. Pat. No. 3,985,682. The extrudates were then removed from the copper nitrate solution, drained, blotted dry and dried in a forced air drying oven overnight at about 195° F. The nitrates were decomposed to oxides by calcining under air at 800° F. for about 3 hours.

Sorbents B-1, B-2 and B-3 were prepared in the same manner as Sorbent A (the alumina had a B.E.T. surface area of 247 M$^2$/g; pore volume of 0.54 cc/g.) except that the alcohol immersion step was ommited since total copper impregnation was desired with the smaller particles. The copper impregnated extrudates were crushed and screened to three different sizes, 80/100 mesh (average particle size 160 microns), 42/60 mesh (average particle size 330 microns) and 10/20 mesh (average particle size 1400 microns) for Sorbents B-1, B-2 and B-3 respectively. The sorbent particles were then tumbled for ½ hour to remove the rough edges and then rescreened. The final Cu analysis for each of the three sizes of particles was 4.54 wt. %, 4.78 wt. % and 4.90 wt. %, for Sorbents B-1, B-2 and B-3, respectively, for Cu and Mg the analysis was about 0.3 wt. % for each of the three particle sorbent sizes.

The testing unit consisted of a sandbath-heated, 16 mm quartz reactor of downflow design. The gas feed blend (measured by rotameters) plus water was introduced at the inlet tube and passes down to near the bottom of the reactor, up through a preheating coil and entered the reactor above the sorbent. The gas flow continued downward through the sorbent bed and out the gas exit line though a knockout pot to an SO$_2$ analyzer (air pollution monitor manufactured by Dyansciences Corp. equipped with a 55-330 sensor). Provision was made for by-passing the reactor so as to permit analysis of the feed gas.

The simulated flue gas had the following approximate volume percent composition:

| Component | Volume Percent |
| --- | --- |
| CO$_2$ | 10.2 |
| O$_2$ | 2.1 |
| SO$_2$ | 0.27 |
| H$_2$O | 10 |
| N$_2$ | Balance |

The simulated processes were carried out by placing about 20 cc volume of the test sorbent in the reactor placed in the sandbath and brought to a temperature of 700° F. The SO$_2$ analyzer was checked against a certified Matheson SO$_2$ gas blend as standard. Using the reactor by-pass the feed gas blend was checked for proper SO$_2$ content and the gas rate 3 liters/1 minute) was checked using a wet test meter. Water was fed by a Ruska pump and vaporized in the reactor inlet preheater. The sorption was carried out at atmospheric pressure. Prior to starting the sorption cycle the reactor was lined out with all gases and water except SO$_2$ passing over the sorbent. At the start of the sorption cycle SO$_2$ was cut in and the amount of SO$_2$ in the exit gas measured as a function of time using the SO$_2$ analyzer. When the SO$_2$ content in the exit gas reached 1000–1100 ppm the sorption cycle was terminated by cutting off all the gases except nitrogen. The reactor was purged with nitrogen-steam (85/15) for 4 minutes at the rate of approximately 2 l./min. The nitrogen was then cut out, and the sorbent regenerated by cutting in H$_2$-steam (50/50 mixture ca. 600 cc/min.) for 20 minutes. At the end of the regeneration cycle the sorbent was purged again with nitrogen for 4 minutes Then all of the gases (except SO$_2$) were pased over the sorbent and through the analyzer until the analyzer was showing zero SO$_2$. Another sorption cycle was then initiated by cutting in the SO$_2$. The percent sulfation (copper utilization) was calculated from the exit SO$_2$ concentration-time data when 300 ppm SO$_2$ in the exit gas was scorded. Copper utilization was also calculated at the 90% cumulative SO$_2$ removal level. The following table illustrates the affect of particle size in the fixed bed simulated flue gas desulfurization process.

TABLE V

COMPARISON OF SMALL PARTICLE SIZE SORBENT U.S. ½" RINGS IN SIMULATED FLUE GAS DESULFURIZATION

| | Copper on Magnesia Stabilized Al$_2$O$_3$ | |
| --- | --- | --- |
| Sorbent | Sorbent A | Sorbent B-1 |
| Size | ½ inch rings | 80/100 Tyler mesh |
| Temperature | 730° F. | 700° F. |
| Gas Space Velocity[(1)] | | |
| V/Hr/V | 2500 | 8800 |
| V/Hr/W | 7.5 | 20.7 |
| Approximate Copper Utilization at 300 pm | | |
| SO$_2$ Breakthrough | 30–38% | 70% |
| Approximate Copper Utilization at 90% | | |

TABLE V-continued

COMPARISON OF SMALL PARTICLE
SIZE SORBENT U.S. ¼" RINGS
IN SIMULATED FLUE GAS
DESULFURIZATION

| | Copper on Magnesia Stabilized $Al_2O_3$ | |
|---|---|---|
| Sorbent | Sorbent A | Sorbent B-1 |
| $SO_2$ removal | 45–50% | 95% |

(1)The feed rate per gram of copper was similar in the two cases.

The data Table V shows that at over 3 times the V/Hr/V space velocity the smaller sorbent has substantially more copper utilization as the ¼ inch rings. Thus one would expect that by using the smaller sorbent sized higher through-puts and improved copper utilizations would be possible.

Further tests were conducted with the same simulated flue gas at a space velocity of 8800 V/Hr/V and at 700° F. using Sorbents B-1, B-2 and B-3 to establish a direct comparison on the effect of particle size. The following table (Table VI) summarizes the results of these tests.

TABLE VI

Effect of Particle Size on Copper Utilization[1]

| Sorbent | Sorbent Mesh Size | Avg. Particle Size | Wt. % Cu | Wt. % $Cu^2$ Utilized |
|---|---|---|---|---|
| B-1 | 80–100 | 160 | 4.54 | 70 |
| B-2 | 42–60 | 330 | 4.78 | 58 |
| B-3 | 10–20 | 1400 | 4.90 | 50 |

[1]Feed gas vol. % 10.2%, $CO_2$; 2.1% $O_2$; 0.27% $SO_2$; 10% $H_2O$; Balance $N_2$. Condition: V/Hr/V ca. 8800; Temperature 700° F., Pressure ca. atmospheric
[2]As measured when 300 ppm $SO_2$ is reached in the exit gas.

The above data clearly show an advantage in copper utilization for use of the smaller particle size sorbents. Further tests at 650° F. and 750° F. show that this advantage exists at these temperatures as well. In fact increasing the temperature from 650° F. to 750° F. showed an increase in sulfation (copper utilization) as shown in Table VII.

TABLE VII

Effect of Temperature on Copper Utilization[1]

| Temperature, °F. | Wt. % Cu Utilized[2] | Cum. % $SO_2$ Removed |
|---|---|---|
| 650 | 43 | 98 |
| 700 | 70 | 98 |
| 750 | 89 | 99 |

[1]Sorbent B-1, Feed gas vol. % 10.2% $CO_2$; 2.1% $O_2$; 0.27% $SO_2$; 10.0 $H_2O$, balance $N_2$. Conditions: V/Hr/V ca. 8800, Temperature 700° F., Pressure ca. atmospheric
[2]As measured when 300 ppm $SO_2$ is reached.

Since it is necessary to use sorbent having magnetic properties in the process of the invention tests were conducted using composite magnetizable sorbent particles. The preparation of a $SO_2$ sorbent for use in the magnetic bed entailed the coating of stainless steel (410 SS) with alumina followed by impregnation of this "magnetic alumina" with copper and magnesium. Comparing sorbents prepared with this "magnetic alumina" vs. a spray dried alumina, provided information on the effects of stainless steel on copper utilization. Also, comparing the magnetic properties of fresh vs. discharged sorbent, data was obtained which determines whether operations in a flue gas environment affects the magnetic properties of the sorbent. Table VIII illustrates the results of tests showing the copper utilization of magnetic and non-magnetic sorbents.

TABLE VIII

| | Copper Utilization of Magnetic Sorbents[1] | | | |
|---|---|---|---|---|
| Sorbent | C-1[2] | C-2[3] | C-3[4] | C-4[5] |
| Cu, Wt. % on Sorbent[6] | 4.71 | 2.74 | 4.03 | 2.74 |
| Cu, Wt. % on $Al_2O_3$ | 5 | 5 | 7.5 | 5 |
| Cu Utilization at 300 ppm $SO_2$ breakthrough | 46 | 38 | 46 | 39 |

[1]Feed gas vol. % 10.2% $CO_2$; 2.1% $O_2$; 0.27% $SO_2$; 10% $H_2O$, balance $N_2$. Conditions: V/Hr/V 8500; 50/100 mesh particles; 700° F.
[2]Sorbent C-1 is a copper on spray dried $Al_2O_3$ having a B.E.T. surface area of 285 $m^2/g$ and a pore volume of 1.15 cc/g. The spray dried alumina which had been calcined for 2 hours at 1000° F. was impregnated with $Cu(NO_3)_2 \cdot 3H_2O$ and $Mg(NO_3)_2 \cdot 6H_2O$ dissolved in acetone to give approximately 5% Cu and 0.3% Mg on the alumina.
The sorbent was air dried and calcined for 3 hours at 800° F. and rescreened at 50/100 mesh. Cu analysis = 4.04% (theor. 4.71%) and Mg analysis 0.28%.
[3]Sorbent C-2 is a copper on $Al_2O_3$ containing stainless steel prepared as follows: 30 gms. of "magnetic $Al_2O_3$" (410 stainless steel coated with $Al_2O_3$ 43/57) of 50/100 mesh were impregnated with copper nitrate and magnesium nitrate to give a nominal 5 wt. % Cu and 0.3 Mg on $Al_2O_3$ using acetone as the solvent. The sorbent was air dried, calcined for 3 hours at 800° F. and rescreened to 50/100 mesh. The Cu analysis was 2.92% (theor. 2.74%) and Mg (theor.) was 0.16%.
[4]Sorbent C-3 is a copper on $Al_2O_3$ containing stainless steel prepared as follows: 30 gms of the "magnetic $Al_2O_3$" described above for C-2 were impregnated as in C-2 to give 7.5% Cu and 0.3% Mg on $Al_2O_3$ basis, % Cu (analysis) on sorbent was 4.13 (theor.) 4.03%.
[5]Sorbent C-4 is a physical mixture (43/57) of 410 stainless steel particles and sorbent C-1 (4.71% Cu on spray dried $Al_2O_3$) was prepared. This mixture gave a theoretical copper content in the mixture of 2.74%. (This run was conducted at a space velocity of 6600 V/Hr/V ca.
[6]Calculated values are reported in the Table.

The data in Table VIII show that Sorbent C-2 had a lower activity than the spray dried alumina (possibly due to copper interaction with the stainless steel during the copper impregnation step) but the activity was restored to that of the spray dried alumina sorbent C-1 when the level of Cu was increased to a nominal 7.5%. The physically mixed, magnetic sorbent C-4 possessed equivalent activity to the impregnated magnetic sorbent at 700° F. albeit at a somewhat lower space velocity. At 750° F., compare C-2 vs C-4, the activity for the physically mixed sorbent was somewhat lower (53% vs. 61%). The fact that the sorbent prepared by physical mixing the stainless steel with copper on alumina sorbent showed lower activity than the sorbent prepared by impregnating copper on alumina-coated stainless steel, would seem to rule out any harmful interaction with the stainless steel during the impregnation-calcination step used to prepare the latter sorbent.

The magnetic properties of the discharged sorbents were tested and the data obtained indicated that the magnetic properties of the discharged sorbent did not change markedly relative to those of the fresh sorbent. These results indicate that the stainless steel is not being significantly oxidized or reduced under the test conditions.

The sorption of $SO_2$ using the simulated flue gas feed on various 10/20 metal oxides (e.g. $ThO_2$, $U_3O_8$, $Al_2O_3$ and $MAlO_4$ (M=a metal) and $ZrO_2$ coated alumina) at low temperatures (e.g., 250°–300° F., and at a space velocity of 6,000 V/Hr/V) followed by nitrogen-steam regeneration at 750° F. (space velocity: 3,000 V/Hr/V) showed that the zinc alumina spinel ($ZnAlO_4$) to be the most active followed by a zirconia coated alumina and alumina. Sorption cycles were remarkably consistent as measured by the time required to achieve 300 ppm $SO_2$ in the exit gas.

Lime (calcium oxide) is also a feasible SO$_2$ sorbent in a non-regenerative process. The lime sorbent useful in the practice in the present invention is a physical mixture of a fluidizable magnetic substance (e.g., stainless steel, cobalt, cobalt alloys, etc.) and lime. The sulfated or sulfited lime after separation is not regenerated. When using lime as a sorbent it is advisable to use relatively higher temperatures, e.g., 900° F. and higher, particularly for smaller particle sizes, e.g., 20–60 mesh lime particles. At the higher temperatures, however, care should be directed to selection of the magnetic particles so that the curie point of the magnetic particles is not encountered at the operating temperatures.

In addition to the sorbents described above, other flue gas desulfurization sorbents may be utilized in the magnetically stabilized cross-flow contactor. For example, the cerium oxide sorbent disclosed is U.S. Pat. No. 4,001,375, the disclosure of which is incorporated herein by reference, may be used as a composite or in admixture with suitable magnetic particles. In such a process the flue gas may be contacted with the cerium oxide-magnetic composite or admixture at a temperature ranging from 300° C. to 800° C. to form cerium sulfate and/or sulfite and regeneration of the sorbent can be accomplished by contacting the sorbent with a reducing gas, for example, hydrogen is admixture with steam or other inert gases at a temperature ranging from 500° C. to 800° C. to convert the cerium sulfate or sulfite to cerium oxide. During the regeneration step, the desorbed species is initially sulfur dioxide. However, when about 50% of the sulfur is removed from the sorbent, the desorbed species becomes H$_2$S. Thus, an admixture of SO$_2$ and H$_2$S are provided with the excess reducing gas, which can be fed conveniently to the Claus plant for conversion into elemental sulfur. Preferably, the cerium oxide will be on an inert support. The unsupported cerium oxide will preferably have a B.E.T. surface area of at least 10 m$^2$/g., more preferably 20–40 m$^2$/g.

Another example of sorbents useful in the flue gas desulfurization in the magnetically stabilized cross-flow contactor comprises magnetic composites or admixtures of the sorbents disclosed in U.S. Pat. No. 4,001,376, the disclosure of which is incorporated herein by reference. Such sulfur dioxide sorbents are comprising of a porous gamma-alumina base, about 2–20 wt. % (based on alumina) of a coating of a refractory oxide such as titanium dioxide, zirconium dioxide, or silica, and an active material, such as copper oxide, which is capable of selective removal of sulfur oxides from a gas mixture.

EXAMPLE 6

A simulated flue gas desulfurization process utilizing the magnetically stablized cross-flow contactor was designed based, in part, on the fixed bed data in Example 5. The design basis consisted of treating a flue gas from a coal-fired boiler generating approximately 2M lbs/hr of steam. The coal is Illinois No. 6, but with the ash level increased to match the flue gas from East Texas Lignite. This gives both the highest SO$_2$ and fly ash loadings. Coal and flue gas compositions and conditions are given below. The flue gas temperature is between 700°–750° F. This temperature corresponds roughly to the temperature into the boiler air preheater.

The design basis for SO$_n$, NO$_n$, and particulate removal is as follows:

| | |
|---|---|
| NO$_x$ | 0.15 lb/M Btu |
| SO$_x$ | 0.3 lb/M Btu |
| Particulates | 0.02 lb/M Btu |

The specific design basis for each process step (identified hereafter by stream numbers) are given in Table IX.

The magnetically stabilized cross-flow flue gas cleanup system is a dry sorbent process that simultaneously removes SO$_x$, NO$_x$, and particulates from flue gas. The system consists of a multipanel bed contactor (as shown in FIG. 6) where the SO$_x$, NO$_x$, and particulates are removed, an elutriator where particulates are stripped from the circulating catalyst and collected for disposal, and a regenerator where the sorbent is regenerated and SO$_2$ liberated for downstream recovery. The sorbent consists of 30 wt. % alumina spheres (impregnated with 5 wt. % copper) and 70 wt. % 410 stainless steel particles (which give the sorbent magnetic properties) having a particle density of 137 lb/ft$^3$ (2.2g/cm$^3$) and a bulk density of 75.5 lb/ft$^3$. The particle size ranged from 250–1680 mm.

Flue gas (stream 1) is taken from a boiler economizer section at 700°–750° F. and mixed (stream 3) with NH$_3$ (stream 2) before entering (stream 4) the magnetically stabilized crossflow contactor. The ammonia acts to decompose the NO$_x$ via the following overall reaction:

$$NO_x + NH_3 \xrightarrow[\text{Cat.}]{O_2} N_2 + yH_2O$$

In the reactor the flue gas flows cross-current at a superficial gas velocity through the panel area of 3 ft/sec (5 ft/sec through the louvers) to a magnetically stabilized moving bed or sorbent, which is traveling vertically down the reactor panels having a thickness of 9 inches. The temperature in the bed is about 748° F. The pressure drop in the bed is 15 inches of water (bed and louvers) and the maximum space velocity is 6500 V/V/H. The maximum catalyst dust loading is 3 wt. % and the maximum copper sulfation is 75%. The applied magnetic field is held at 300 oersteds by use of 5 magnet modules to provide a substantially uniform applied magnetic field over the entire length of the bed. Here the particulates are trapped by the sorbent spheres, the NO$_x$ decomposition is catalyzed with and SO$_2$ is adsorbed according to the reaction:

$$SO_x + Cu + O_2 \rightarrow CuSO_4$$

Clean flue gas (stream 5) passes out of the reactor and on to the boiler air preheater, induced draft fan, and stack. The decomposition and adsorption reactions are both exothermic and the exiting flue gas leaves at 750°–800° F.

The magnetic sorbent from the reactor (stream 6) flows by gravity to the elutriator through magnetic lock hoppers on each panel which regulate the sorbent circulation rate and ensure even flow through the panels. In the elutriator, (having a bed temperature of 711° F. and a pressure of about 3 psig) fly ash collected in the reactor is elutriated from the sorbent with air at 2–3 ft/sec. (stream 7) and collected in cyclones via stream 8 for disposal. The temperature in the cyclones is about 710° F. Overhead (stream 17) from the cyclones recycles to the top of the reactor sorbent distributor. The fly ash is drawn off of the cyclones via stream 16.

From the elutriator, sorbent is transferred to the regenerator through an overflow line (stream 9). The fluid bed in the regenerator (having a bed temperature of 719° F. and a pressure of 10 psig). is magnetically stabilized by the action of an electromagnet coaxially surrounding the regenerator vessel, and the spent sorbent flows downward through the regenerator bed, countercurrent to the regenerator gas (stream 10). The applied magnetic field on the regenerator vessel is 200 oersteds to provide a voidage of 0.6. The sorbent is regenerated by the following overall reaction:

$$CuSO_4 + 2H_2 \rightarrow Cu + 2H_2O + SO_2$$

$SO_2$ from the regenerator passes overhead (stream 11) to downstream recovery in a Claus plant or sulfuric acid plant. The regenerated sorbent is transferred back (stream 12) to the reactor via a riser using aeration air (stream 13) and distributed to the panels via a transfer line (stream 14) by a small fluid bed above the panels. The solids and air from stream 13 are separated and the air is emitted via a transfer line (stream 15) where this line is joined with the sorbent distributor overhead (stream 18.)

Table IX below shows the design basis for the individual pieces of equipment in the flue gas desulfurization process described above in this example.

TABLE IX
HEAT AND MATERIAL BALANCE
MSB FLUE GAS CLEANUP PROCESS

| Stream Number<br>Stream Name | 1<br>Flue Gas From<br>Boiler | 2<br>Amonia<br>Injection | 3<br>Recycle<br>Air | 4<br>Reactor<br>Feed | 5<br>Clean Flue<br>Gas | 6<br>Spent<br>Sorbent |
|---|---|---|---|---|---|---|
| Temperature, °F. | 700 | 60 | 737 | 710 | 748 | 748 |
| Pressure, psia | | 150 | | | | |
| (in. $H_2O$) | (−4.0) | | | | (−19.0) | |
| Gas Rate | | | | | | |
| Total kLb/Hr | 2861.9 | 0.6 | 237.9 | 3099.8 | 3077.0 | — |
| Component MPH | | | | | | |
| $CO_2$ | 12799.6 | — | — | 12799.6 | 12799.6 | — |
| $H_2O$ | 8018.4 | — | 170.2 | 8188.6 | 8244.5 | — |
| $N_2$ | 71813.4 | — | 6578.1 | 78391.5 | 78431.3 | — |
| $O_2$ | 3811.4 | — | 1560.6 | 5732.0 | 5222.6 | — |
| NO | 56.0 | — | — | 56.0 | 14.0 | — |
| $SO_2$ | 297.9 | — | — | 297.9 | 13.1 | — |
| $H_2$ | — | — | — | — | — | — |
| CO | — | — | — | — | — | — |
| $CH_4$ | — | — | — | — | — | — |
| $NH_3$ | — | 37.3 | 37.3 | 37.3 | — | — |
| Total MPH | 96796.9 | 37.3 | 8346.2 | 105142.9 | 104725.1 | — |
| Sorbent Rate, kLb/Hr | | | | | | |
| $Al_2O_3$ + SS 410 | — | — | — | — | — | 4149.9 |
| Cu | — | — | — | — | — | 0.0 |
| CuO | — | — | — | — | — | 7.6 |
| $CuSO_4$ | — | — | — | — | — | 45.5 |
| Anh | 106.5 | — | — | 118.3 | 0.1 | 124.4 |
| Total | 106.5 | — | — | 118.3 | 0.1 | 4327.4 |

| Stream Number<br>Stream Name | 7<br>Elutriator<br>Air | 8<br>Elutriator<br>Overhead | 9<br>Deashed Spent<br>Sorbent | 10<br>Regeneration<br>Gas | 11<br>$SO_2$ To<br>Recovery | 12<br>Regenerated<br>Sorbent |
|---|---|---|---|---|---|---|
| Temperature, °F. | 95 | 711 | 711 | 750 | 719 | 917 |
| Pressure, psia | | | | | | |
| (in. $H_2O$) | 7 | 18.0 | | 90 | 24.7 | |
| Gas Rate | | | | | | |
| Total kLb/Hr | 205.5 | 205.5 | — | 18.2 | 47.1 | — |
| Component MPH | | | | | | |
| $CO_2$ | — | — | — | 180.3 | 180.3 | — |
| $H_2O$ | 143.7 | 143.7 | — | 450.6 | 1115.2 | — |
| $N_2$ | 5555.3 | 5555.3 | — | — | — | — |
| $O_2$ | 1478.3 | 1478.3 | — | — | — | — |
| NO | — | — | — | — | — | — |
| $SO_2$ | — | — | — | — | 284.8 | — |
| $H_2$ | — | — | — | 664.9 | 0.0 | — |
| CO | — | — | — | 26.1 | 26.1 | — |
| $CH_4$ | — | — | — | 2.9 | 2.9 | — |
| $NH_3$ | — | — | — | — | — | — |
| Total MPH | 7177.3 | 7177.3 | — | 1324.8 | 1609.3 | — |
| Sorbent Rate, kLb/Hr | | | | | | |
| $Al_2O_3$ + SS 410 | — | — | 4149.9 | — | — | 4149.9 |
| Cu | — | — | 0.0 | — | — | 24.1 |
| CuO | — | — | 7.6 | — | — | — |
| $CuSO_4$ | — | — | 45.5 | — | — | — |
| Anh | — | 118.2 | 6.2 | — | — | 6.2 |
| Total | — | 118.2 | 4209.2 | — | — | 4108.2 |

| Stream Number<br>Stream Name | 13<br>Aeration Air to<br>Regen Sorbent Riser | 14<br>Sorbent<br>to Reactor | 15<br>Transfer<br>Line Air | 16<br>Fly Ash | 17<br>Elutriator<br>Cyclone<br>Overhead | 18<br>Sorbent Distributor<br>Overhead |
|---|---|---|---|---|---|---|

TABLE IX-continued

HEAT AND MATERIAL BALANCE
MSB FLUE GAS CLEANUP PROCESS

| | | | | | | |
|---|---|---|---|---|---|---|
| Temperature, °F. | 95 | 743 | 743 | 710 | 710 | 741 |
| Pressure, psia | 75 | | | | | |
| (in. $H_2O$) | | | | | | |
| Gas Rate | | | | | | |
| Total kLb/Hr | 37.8 | — | 31.8 | — | 205.5 | 205.5 |
| Component MPH | | | | | | |
| $CO_2$ | — | — | — | — | — | — |
| $H_2O$ | 26.5 | — | 26.5 | — | 143.7 | 143.7 |
| $N_2$ | 1022.8 | — | 1022.8 | — | 5555.3 | 5555.5 |
| $O_2$ | 272.2 | — | 82.3 | — | 1478.3 | 1478.3 |
| NO | — | — | — | — | — | — |
| $SO_2$ | — | — | — | — | — | — |
| $H_2$ | — | — | — | — | — | — |
| CO | — | — | — | — | — | — |
| $CH_4$ | — | — | — | — | — | — |
| $NH_3$ | — | — | — | — | — | — |
| Total MPH | 1321.5 | — | 1131.6 | — | 7177.3 | 7177.3 |
| Sorbent Rate, kLb/Hr | | | | | | |
| $Al_2O_3$ + SS 410 | — | 4149.9 | — | — | — | — |
| Cu | — | 0.0 | — | — | — | — |
| CuO | — | 30.2 | — | — | — | — |
| $CuSO_4$ | — | — | — | — | — | — |
| Anh | — | 6.2 | — | 106.4 | 11.8 | 11.8 |
| Total | — | 4186.3 | — | 106.4 | 11.8 | 11.8 |

The above examples show the usefulness of the magnetically stabilized gas cross-flow contactor as a particulate capture device at utility boiler pressures and temperatures. The contactor may also be used to remove particulates and other contaminates at high temperatures and pressures. For example, the magnetically stabilized gas cross-flow contactor may be used to remove particulates and chemical contaminates from flue gas streams from a pressurized fluidized bed combuster (PFBC) at temperature ranging from 1500°-1700° F. and pressures ranging from 5-20 atmospheres. At such high temperatures and pressures, particularly under the oxidative and corrosive conditions due to the flue gas, it is desirable to use the cobalt-containing particles described in copending U.S Application Ser. No. 000,384, the disclosure of which is incorporated herein by reference. This high temperature and pressure capture collection and chemical scavenger process may be practiced by use of the magnetically stabilized gas cross-flow contactor described herein. For example, the devices shown in FIGS. 4-10 may be used.

In typical pressurized fluidized bed combustion applications, flue gas contains 4-10 grs/SCF exiting from the combustor with a particle size distribution ranging from 1-600 microns. It is generally desirable to have a hot gas cleanup system having an overall collection efficiency of 99.9%. Additionally, graded efficiencies of 99.95% for particulates greater than 5 microns, 99.5% for particulates between 4-5 microns, and 99.5% for particulates less than 4 microns should be removed. One way to accomplish the above particulate capture standard in a combined cycle power generation system under high temperatures and pressures is to slightly modify the schematic shown in FIG. 8 by incorporating cyclones in series between the fluid bed combustor and the magnetically stabilized cross-flow contactor. The purpose of the cyclones is to provide efficient and economical removal of particulates greater than 4 microns, thereby reducing the amount of material which must be removed by the magnetically stabilized cross-flow contactor. This will have a favorable impact in reducing the capital and operating costs since it will reduce the size and complexity of the "back end" equipment required for removing the captured flyash from the bed material.

The use of cyclones in series with magnetically stabilized cross flow contactor provides redundancy in the system. The cyclones also provide an effective margin of safety to prevent rapid catastrophic failure of gas turbine blades in the event of failure of the contactor. Similarly, the magnetically stabilized gas flow contactor can easily accommodate an additional load resulting from cyclone failure, thereby, permitting shut-down and repair to the system without endangering the highly expensive gas turbines.

In typical pressurized high temperature fluidized combustion processes, the flue gas contains 2 to 5 ppm of alkali metal exiting the combustion. In order to reduce the susceptibility of the turbine blades to the deleterious action of the alkali, at least about 99.6% of the alkali in the vapor phase must be removed. To accomplish this objective, alkali metal scavengers, in the form of metal oxides or mixed metal oxides, may be used to remove the alkali metals. Examples of suitable metal oxides are alumina, banxite, alundum, silica gel, diatomaceous earth and kaolin clay. These scavenger materials may be suitably mixed with the cobalt-based magnetizable particles which are necessary to stabilize the panel bed with magnetic field. The amount of scavenger used will be sufficient to remove trace alkali metals to levels of less than 0.02 ppm by weight. However, this amount will preferably not exceed 25 wt. % of the total bed solids.

After the alkali metal scavenger has removed trace alkali metals, the sorbent may be separated from cobalt-based materials using a magnetic separation. Although it may be possible to regenerate the scavenger for reuse, it is preferable to use the scavenger on a "once-through" basis. Because of the low concentration of trace metals in the flue gas, even a non-regenerable system would require modest amounts of scavenger material.

In a typical example of the high pressure, high temperature combined power cycle process, flue gas from the high pressure fluid bed combustor at 1-2 lbs/sec of flue gas over a temperature of 1500°-1700° F. and a pressure range of 6-16 atm is passed through cyclones to remove the bulk of flyash/dolomide particulates. The flue gas then is passed into a magnetic cross-flow panel bed consisting of an admixture of ferromagnetic particles necessary to stabilize the bed and alkali metal scavenger particles such as bauxite or alumina. The stabilized moving panel bed acts as a filter for capturing particulate by impaction, interception of diffusion on the bed material. Trace quantities of sodium and potassium are removed by reaction or adsorption with the scavenger bed material. As the concentration of flyash increases on the bed, it is removed from the bottom of the bed and circulated by a gas transfer line to, first a rough cut cyclone, which removes any flyash which has been detached from the bed material and, then, to an elutriator where the remaining flyash is removed from the bed material. Bed material is returned to the magnetically stabilized bed while the dust laden gas from the elutriator is combined with the transfer line gas and sent to a cyclone where the dust is separated from the gas. The remaining gas is either cleaned further in a bag filter and sent to a stack or recirculated to the combustor as makeup air.

As trace metals build up on the non-magnetic material, they are removed by "bleeding" a side-stream of particles and subsequently removing the scavenger bed material. This separation may be easily accomplished by using a magnetic separation.

The key features of use of the magnetically stabilized cross-flow contactor in the high pressure high temperature fluid bed combustion process are:

The gas velocity before bed material is entrained or "blown out" of the bed is significantly increased because of the orientation and structuring of the bed material by the magnetic field.

Low pressure drop. The structuring and orientation of the bed results in a higher void fraction and hence lower pressure drop per unit thickness of the bed when compared with a conventional moving granular panel bed operating at the same conditions.

The collection efficiency significantly increased over conventional panel beds.

Alkali metals can be picked up by non-magnetic scavengers which are admixed with the magnetic material.

Another use for the magnetically stabilized cross-flow contactor of the invention involves using the same to control dust in grain elevators, flour mills and other operations with potentially explosive dust is a safety hazard. The presence of grain dust in grain elevators, flour mills and other agricultural and mining operations presents a potential safety problem. These problems may be handled by the use of the magnetically stabilized cross-flow contactor. For example, air purge streams are used to remove dust from the silos, transfer points, loading facilities, etc. The air from these points passes through the magnetically stabilized cross-flow contactor in which the finely divided solids are removed from the air before it is discharged by an induced draft fan to the atmosphere. In the magnetically stabilized cross-flow contactor the gas flows in a cross-flow manner through a moving bed of magnetically stabilized solids. The solids are a very high density ferromagnetic material and can range in particle size from about 100 to 2000 microns. Particle size is adjusted to control pressure drop and particulate capture efficiency. The solids from the filter pass through a moving grate or a vibrating sieve which is continuously contacted with suitable means to remove the dust. Solids pass from the grate or sieve and are transported back to the filter vessel. This system offers the advantages of a very high gas velocity with a very low pressure drop. The panel bed thickness may range from about 4 to 24 inches and superficial gas velocities up to and excess of 20 ft/sec. can be achieved. A particular advantage of this system is the the grain dust is collected in a solid and is diluted so that it is non-explosive in the filtering operation. As a further safety measure the solids are readily washed with a suitable liquid which removes the dust, e.g., water, from the magnetizable solids. The solids can be drained of the excess liquid and returned to the filter zone.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A process for the removal of particulates entrained in a fluid, said process comprising the steps:
   (a) continuously introducing and removing a bed comprising a particulates capture medium through at least one porous chamber in a descending manner or direction, said bed comprising a particulates capture medium comprises a plurality of solid, discrete magnetizable particles;
   (b) structuring and controlling the porosity in said bed by applying a magnetic field to said bed in a manner such that the magnetic field is substantially colinear with the external force field within said chamber;
   (c) passing a gas containing entrained particulates through said descending bed of particulate capture medium in a manner such that it has a velocity component substantially perpendicular to the external force field and the applied magnetic field within said chamber and withdrawing a gaseous stream substantially free of entrained particulates.

2. The process of claim 1 wherein the particulate capture medium is continuously withdrawn and recharged into said chamber in a periodic manner.

3. The process of claim 1 wherein the solid discrete magnetizable particles have a mean diameter particle size ranging from about 100 microns to about 1000 microns and the entrained particulates have a mean diameter particle size ranging from 0.01 to about 50 microns.

4. The process of claim 1 wherein said external force field is gravity.

5. The process of claim 1 wherein the bed additionally contains nonmagnetizable particles.

6. The process of claim 1 wherein the particles are a composite of magnetizable material and nonmagnetizable material.

7. The process of claim 1 wherein a plurality of particulate capture beds are used.

8. The process of claim 1 wherein the magnetized solid discrete magnetizable particles are characterized as being elongated.

9. The process of claim 1 wherein the entrained particulates have a mean diameter particle size within the range from about 0.01 to about 10 microns.

10. The process of claim 1 wherein the particulate solids are regenerated in a regenerator vessel connected to the particulate capture bed.

11. The process of claim 10 wherein the regenerator is a separate vessel selected from the group consisting of a cyclone mechanical separator or magnetic separator.

* * * * *